US011349589B2

(12) United States Patent
Carlson et al.

(10) Patent No.: US 11,349,589 B2
(45) Date of Patent: May 31, 2022

(54) METHODS AND SYSTEMS FOR DECENTRALIZED RAIL SIGNALING AND POSITIVE TRAIN CONTROL

(71) Applicant: Metrom Rail, LLC, Crystal Lake, IL (US)

(72) Inventors: Richard C. Carlson, Palatine, IL (US); Kurt Alan Gunther, Woodstock, IL (US); Sara Jo Woitel, Lake Zurich, IL (US); Marc Wayne Cygnus, Mundelein, IL (US)

(73) Assignee: METROM RAIL, LLC, Crystal Lake, IL (US)

( * ) Notice: Subject to any disclaimer, the term of this patent is extended or adjusted under 35 U.S.C. 154(b) by 221 days.

(21) Appl. No.: 16/290,576

(22) Filed: Mar. 1, 2019

(65) Prior Publication Data

US 2019/0263432 A1   Aug. 29, 2019

Related U.S. Application Data

(63) Continuation-in-part of application No. 16/055,905, filed on Aug. 6, 2018.
(Continued)

(51) Int. Cl.
*B61L 27/70* (2022.01)
*H04J 11/00* (2006.01)
(Continued)

(52) U.S. Cl.
CPC .......... *H04J 11/0079* (2013.01); *B61L 3/006* (2013.01); *B61L 3/125* (2013.01); *B61L 15/0027* (2013.01);
(Continued)

(58) Field of Classification Search
CPC .......... B61L 15/0027; B61L 2027/005; B61L 2201/00; B61L 2205/00; B61L 23/20;
(Continued)

(56) References Cited

U.S. PATENT DOCUMENTS 2,475,578 A   7/1949   Halstead
2,762,913 A   9/1956   Jepson
(Continued)

FOREIGN PATENT DOCUMENTS

AU   2012227260   4/2014
AU   2015201462   10/2015
(Continued)

OTHER PUBLICATIONS

PCT, Notification of Transmittal of the International Search Report and the Written Opinion of the International Searching Authority, or the Declaration, in International application No. PCT/US2014/053900, dated Feb. 18, 2015 (21 pages).
(Continued)

*Primary Examiner* — Mark T Le
(74) *Attorney, Agent, or Firm* — McAndrews, Held & Malloy, Ltd.

(57) ABSTRACT

Systems and methods are provided for decentralized rail signaling and positive train control. A decentralized train control system may include a plurality of wayside units, configured for placement on or near tracks in a railway network, and one or more train-mounted units, each configured for use in a train operating in a railway network that support use of the decentralized train control system. Each train-mounted unit may configured to receive communicate with any wayside unit and/or train-mounted unit that comes within range, with the communicating including use of ultra-wideband (UWB) signals, and for generating control information based on the UWB signals, for use in control-
(Continued)

ling one or more functions associated with operation of the train.

12 Claims, 17 Drawing Sheets

Related U.S. Application Data

(60) Provisional application No. 62/637,774, filed on Mar. 2, 2018, provisional application No. 62/541,454, filed on Aug. 4, 2017.

(51) Int. Cl.
| | |
|---|---|
| *B61L 3/00* | (2006.01) |
| *B61L 27/04* | (2006.01) |
| *H04W 4/40* | (2018.01) |
| *B61L 3/12* | (2006.01) |
| *B61L 15/00* | (2006.01) |
| *B61L 25/02* | (2006.01) |
| *B61L 23/34* | (2006.01) |
| *B61L 23/06* | (2006.01) |
| *B61L 27/20* | (2022.01) |

(52) U.S. Cl.
CPC ............... *B61L 27/04* (2013.01); *B61L 27/70* (2022.01); *H04W 4/40* (2018.02); *B61L 23/06* (2013.01); *B61L 23/34* (2013.01); *B61L 25/021* (2013.01); *B61L 25/025* (2013.01); *B61L 27/20* (2022.01); *B61L 2201/00* (2013.01); *B61L 2205/00* (2013.01)

(58) Field of Classification Search
CPC .. B61L 25/021; B61L 25/025; B61L 27/0005; B61L 27/0038; B61L 27/04; B61L 23/06; B61L 23/044; B61L 27/0088; B61L 25/02; B61L 27/0094; B61L 29/24; B61L 29/32; B61L 3/006; B61L 23/34; B61L 27/70; H02S 99/00; H04W 4/42; H04W 4/44; H04W 4/40
USPC ........................................................ 246/220
See application file for complete search history.

(56) References Cited

U.S. PATENT DOCUMENTS

| | | | |
|---|---|---|---|
| 4,302,811 A | 11/1981 | McElhenny | |
| 4,327,415 A | 4/1982 | Rush et al. | |
| 4,459,668 A | 7/1984 | Inoue et al. | |
| 4,495,578 A | 1/1985 | Sibley et al. | |
| 4,538,228 A | 8/1985 | Brearey et al. | |
| 4,869,557 A | 9/1989 | Gerum et al. | |
| 5,198,800 A | 3/1993 | Tozawa et al. | |
| 5,420,883 A | 5/1995 | Swensen et al. | |
| 5,554,982 A | 9/1996 | Shirkey et al. | |
| 5,620,155 A | 4/1997 | Michalek | |
| 5,652,570 A | 7/1997 | Lepkofker | |
| 5,675,190 A | 10/1997 | Morita | |
| 5,727,758 A | 3/1998 | Penza et al. | |
| 5,924,651 A | 7/1999 | Penza et al. | |
| 5,939,986 A | 8/1999 | Schiffbauer et al. | |
| 5,995,881 A | 11/1999 | Kull | |
| 6,113,037 A | 9/2000 | Pace | |
| 6,135,396 A | 10/2000 | Whitfield et al. | |
| 6,145,792 A | 11/2000 | Penza et al. | |
| 6,208,260 B1 | 3/2001 | West et al. | |
| 6,232,887 B1 | 5/2001 | Carson | |
| 6,435,459 B1 | 8/2002 | Sanderson et al. | |
| 6,666,411 B1 | 12/2003 | Hart et al. | |
| 6,732,023 B2 | 5/2004 | Sugita et al. | |
| 7,167,082 B2 | 1/2007 | Stigall | |
| 7,624,952 B1 | 12/2009 | Bartek | |
| 7,725,252 B2 | 5/2010 | Heddebaut et al. | |
| 8,109,474 B2 | 2/2012 | Bartek | |
| 8,126,035 B2 | 2/2012 | Hashimoto et al. | |
| 8,200,380 B2 | 6/2012 | Ghaly | |
| 8,245,983 B2 | 8/2012 | Gilbertson | |
| 8,248,263 B2 | 8/2012 | Shervey et al. | |
| 8,344,877 B2 | 1/2013 | Sheardown et al. | |
| 8,423,240 B2 | 4/2013 | Mian | |
| 8,478,463 B2 | 7/2013 | Knott et al. | |
| 8,650,242 B2 | 2/2014 | Yuki et al. | |
| 8,651,433 B2 | 2/2014 | Ghaly | |
| 8,786,428 B2 | 7/2014 | Sheardown et al. | |
| 8,952,805 B2 | 2/2015 | Baines et al. | |
| 8,998,149 B2 | 4/2015 | Takahashi et al. | |
| 9,002,546 B2 | 4/2015 | Whitwam et al. | |
| 9,008,854 B2 | 4/2015 | Breed | |
| 9,022,325 B2* | 5/2015 | Tsukamoto | B61L 3/008 246/167 R |
| 9,128,815 B2 | 9/2015 | Kanner et al. | |
| 9,134,411 B2 | 9/2015 | Soder et al. | |
| 10,569,792 B2* | 2/2020 | Fahmy | B61L 23/044 |
| 10,620,320 B2* | 4/2020 | Okada | G01C 21/165 |
| 10,778,363 B2* | 9/2020 | Carlson | B61L 15/0027 |
| 2003/0028323 A1 | 2/2003 | Zeitler et al. | |
| 2003/0214417 A1 | 11/2003 | Peltz et al. | |
| 2004/0155760 A1 | 8/2004 | Grisham | |
| 2005/0010338 A1 | 1/2005 | Kraeling et al. | |
| 2005/0110628 A1 | 5/2005 | Kemwein et al. | |
| 2006/0015224 A1 | 1/2006 | Hilleary | |
| 2006/0151672 A1 | 7/2006 | Heddebaut | |
| 2008/0040023 A1 | 2/2008 | Breed et al. | |
| 2008/0114519 A1 | 5/2008 | Defaux | |
| 2009/0212168 A1 | 8/2009 | Kumar | |
| 2009/0326746 A1 | 12/2009 | Mian | |
| 2010/0063656 A1 | 3/2010 | Knott et al. | |
| 2010/0102954 A1 | 4/2010 | Radivojevic et al. | |
| 2010/0225527 A1 | 9/2010 | Talty | |
| 2010/0268466 A1 | 10/2010 | Amutham | |
| 2010/0327125 A1 | 12/2010 | Braband et al. | |
| 2011/0006912 A1 | 1/2011 | Sheardown et al. | |
| 2011/0046845 A1 | 2/2011 | Kozlay | |
| 2011/0075641 A1 | 3/2011 | Siriwongpairat et al. | |
| 2011/0152971 A1 | 6/2011 | Nghiem et al. | |
| 2011/0172856 A1 | 7/2011 | Kull | |
| 2011/0184621 A1 | 7/2011 | Bock et al. | |
| 2011/0234451 A1 | 9/2011 | Bock et al. | |
| 2012/0029740 A1 | 2/2012 | Bock et al. | |
| 2012/0123617 A1 | 5/2012 | Noffsinger et al. | |
| 2012/0126065 A1 | 5/2012 | Smith et al. | |
| 2012/0286563 A1 | 11/2012 | Lichterfeld et al. | |
| 2012/0296562 A1 | 11/2012 | Carlson | |
| 2012/0296567 A1 | 11/2012 | Breed | |
| 2013/0024054 A1 | 1/2013 | Katsuta et al. | |
| 2013/0046420 A1 | 2/2013 | Gottifredi et al. | |
| 2013/0138276 A1* | 5/2013 | Soderi | B61L 3/008 701/19 |
| 2013/0166114 A1 | 6/2013 | Baines et al. | |
| 2014/0045547 A1 | 2/2014 | Singamsetty et al. | |
| 2014/0046514 A1 | 2/2014 | Jennek et al. | |
| 2014/0191089 A1 | 7/2014 | Reichlin et al. | |
| 2014/0214247 A1 | 7/2014 | Myokei | |
| 2014/0214248 A1 | 7/2014 | Yamada | |
| 2014/0229096 A1 | 8/2014 | Carlson | |
| 2014/0263856 A1 | 9/2014 | Hann | |
| 2015/0032302 A1 | 1/2015 | Foerster et al. | |
| 2015/0060608 A1 | 3/2015 | Carlson et al. | |
| 2015/0329130 A1 | 11/2015 | Carlson et al. | |
| 2015/0344048 A1 | 12/2015 | Kemwein | |
| 2015/0367822 A1 | 12/2015 | Jennek et al. | |
| 2016/0046308 A1* | 2/2016 | Chung | B61L 25/021 701/20 |
| 2016/0200327 A1 | 7/2016 | Liu | |
| 2016/0221592 A1 | 8/2016 | Puttagunta et al. | |
| 2016/0280240 A1 | 9/2016 | Carlson et al. | |
| 2016/0339934 A1 | 11/2016 | Chung et al. | |
| 2017/0101116 A1 | 4/2017 | Shubs, Jr. et al. | |
| 2017/0113707 A1 | 4/2017 | Ghaly | |

(56) References Cited

U.S. PATENT DOCUMENTS

| | | |
|---|---|---|
| 2017/0245192 A1 | 8/2017 | Sadri et al. |
| 2017/0282944 A1 | 10/2017 | Carlson et al. |
| 2019/0054942 A1 | 2/2019 | Carlson |

FOREIGN PATENT DOCUMENTS

| | | |
|---|---|---|
| CA | 22220819 | 1/2000 |
| CN | 1417071 | 5/2003 |
| CN | 1676375 | 10/2005 |
| CN | 201323574 | 10/2009 |
| CN | 102923158 | 2/2013 |
| JP | 2001106074 | 4/2001 |
| JP | 4755521 | 8/2011 |
| JP | 4917313 | 4/2012 |
| KR | 20050097843 | 10/2005 |
| KR | 100733599 | 7/2007 |
| KR | 100975289 | 8/2010 |
| KR | 20140017157 | 2/2014 |
| WO | 03012470 | 2/2003 |

OTHER PUBLICATIONS

Chinese Office Action for Application No. 201710074449.6, dated Jan. 17, 2019 (22 pages).
International Search Report and Written Opinion for PCT/US2016/023754, dated Aug. 8, 2016. (10 pages).
International Search Report and Written Opinion for PCT/US2018/049062, dated Nov. 9, 2018. (13 pages).
International Search Report and Written Opinion for PCT/US19/20385, dated Jun. 28, 2019. (15 pages).
International Preliminary Report on Patentability for PCT/US2018/049062, date of completion—Oct. 26, 2018, 8 pages.
International Search Report and Written Opinion for PCT/US2018/045388, dated Oct. 18, 2018. (16 pages).

* cited by examiner

METHODS AND SYSTEMS FOR DECENTRALIZED RAIL SIGNALING AND POSITIVE TRAIN CONTROL

CLAIM OF PRIORITY

This patent application is a continuation-in-part of U.S. patent application Ser. No. 16/055,905, filed on Aug. 6, 2018. This patent application also makes reference to, claims priority to and claims benefit from U.S. Provisional Patent Application Ser. No. 62/637,774, filed on Mar. 2, 2018. Each of the above identified applications is hereby incorporated herein by reference in its entirety.

TECHNICAL FIELD

Aspects of the present disclosure relate to control technologies and solutions in conjunction with railway systems. More specifically, various implementations of the present disclosure relate to methods and systems for decentralized rail signaling and positive train control.

BACKGROUND

Various issues may exist with conventional approaches for controlling trains. In this regard, conventional systems and methods, if any existed, for controlling trains particularly in mass transit systems, may be costly, inefficient, and cumbersome. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for decentralized rail signaling and positive train control, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
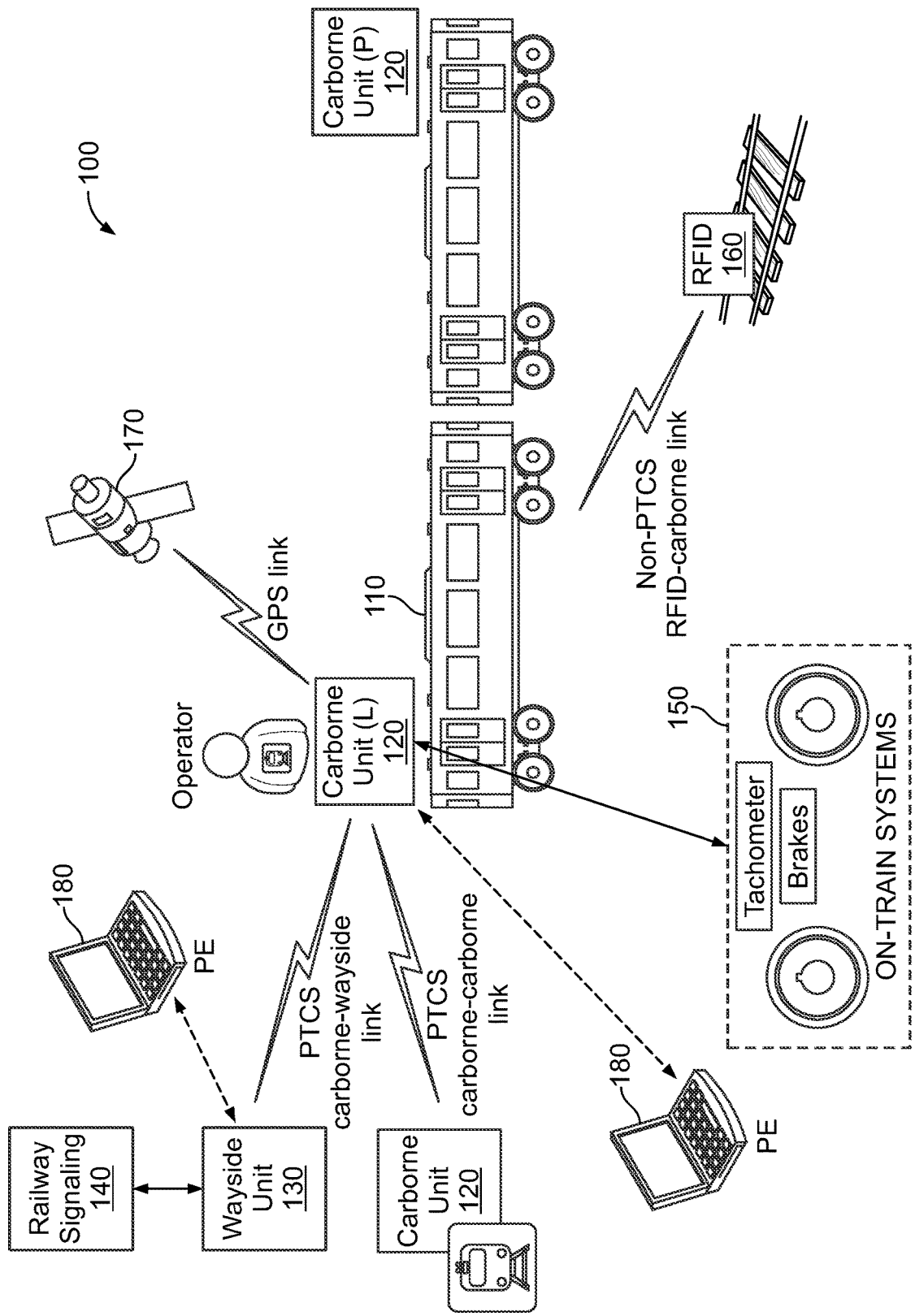
FIG. 1 illustrates an example layout of a train control system, in accordance with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

In accordance with the present disclosure, trains, particularly trains operating under certain conditions—e.g., trains operating in transit systems, may be may be controlled in enhanced manner, particularly by allowing for and supporting mostly decentralized control of trains and operations thereof. This may be done, e.g., by incorporating use of low-cost technology, such as ultra-wideband (UWB) based solutions in controlling trains operating within transit systems, and functions thereof (e.g., safety and/or operation related functions). In this regard, there may be a large gap in available solutions for transit rail signaling systems, with few options available between the fixed block, trip stop based systems in place at many transit agencies, and available high end solutions, such as communications-based train control (CBTC) based solutions. Use of such high end solutions may be not desirable, for various reasons. In this regard, current CBTC systems, especially in brownfield applications, are expensive, difficult to install, have availability issues, require extensive ongoing maintenance, and do not always provide the headroom improvements which are initially projected.

Accordingly, in various implementations in accordance with the present disclosure, proposed positive train control system-phase 2 (PTCS-2) solutions may allow for filling this gap, while remedying the disadvantages and shortcoming of both legacy offerings. In this regard, PTCS-2 base solutions may provide signaling and train control systems that may encompass all or most of the features of legacy high end solutions (e.g., CBTC systems), but at a fraction of the costs (e.g., system cost, installation cost, etc.) and installation efforts. The PTCS-2 based systems may utilizes ultra-wideband (UWB) based wireless technology to enables the train to communicate with wayside devices, allowing for a "train-centric" control system. In other words, in such PTCS-2 based systems most of the functions may be implemented and/or deployed within the trains rather in the surrounding infrastructure. Such approach may be advantageous due to reduced costs (e.g., because the use of wireless technology may eliminate and/or reduces the amount of wayside cabling and associated maintenance; and may reduce Carborne wiring, installation effort and equipment cost), while additionally providing a modular—upgradable signaling system which may be easily customized and accommodate the existing transit agencies' operating rules.

The PTCS-2 based systems may be configured for and/or may enable or support such features and enhancements as collision avoidance, moving block train protection, increased (e.g., doubled) berthing, speed limit adherence, signal adherence, use of braking profiles, RF range testing, train location, speed and direction, signal detection (e.g., moving past red signals), adaptive motion (e.g., reverse moves), worker protection, and dead towing.

In various implementations, the main components of a PTCS-2 based system may comprise the train-borne (or carborne) equipment, wayside equipment (or anchors), and station-mounted equipment (or anchors). The train-borne equipment may comprise, for example, main control rack, mounting hardware, user interface, RFID hardware, train control interfaces, UWB and data communication radios and external antennas. The wayside equipment may comprise such sub-components as ranging and communication anchors, end-of-line, interlocking interfaces, and radios. The station-mounted equipment may comprise such sub-components as ranging anchors (e.g., for precision berthing of trains), communication anchors and/or data interfaces (e.g., cloud based, connected through station located gateways) for external data exchange, etc. Various measures may be incorporated to reduce cost. For example, the components of the PTCS-2 based system may utilize a modular design and may use many of the same components, such as ultra-wideband (UWB) radios.

FIG. 1 illustrates an example layout of a train control system, in accordance with the present disclosure. Shown in FIG. 1 is an example layout of a PTCS-2 based system 100 implemented in accordance with the present disclosure.

As noted above, a PTCS-2 based system is a train-centric system—that is, unlike traditional and/or existing systems (including, e.g., CBTC based systems), this system does not rely on a centralized entity (e.g., "back office") or centralized data structure which must be hard-wired to the system. Rather, as shown in the example implementation illustrated in FIG. 1, the system provides train-based automated control (e.g., operation, protection, etc.). In this regard, PTCS-2 based systems implemented in accordance with the disclosure (e.g., the PTCS-2 based system 100) may be configured for utilizing as core technology, as low-cost communication technology, preferably ultra-wideband (UWB), with UWB radios being used for ranging and/or data transfer.

As shown in FIG. 1, the PTCS-2 based system 100 may comprise carborne units 120 deployed on the train 110, as well as wayside units 130 deployed near tracks traversed by the trains in the transmit systems. Each of the carborne units 120 and the wayside units 130 may comprise suitable circuitry for implementing various aspects of the present disclosure. In this regard, the each of the carborne units 120 and the wayside units 130 may be configured to performed and/or support various communication, control, processing, etc. functions, and/or may incorporate suitable resources (e.g., hardware and/or software) for facilitating performing such functions. Further, each of the carborne units 120 and the wayside units 130 may be particularly configured for deployment in their respective environments—that is, the carborne units 120 may be optimized for deployment within the trains, and the wayside units 130 may be optimized for deployment on or near the tracks.

For example, each of the carborne units 120 may be configured as a train control system rack, and may comprise user interface components (and support functions related thereto), UWB radios (e.g., primary and secondary), data communications (DataCom) radios (e.g., primary and secondary), UWB antennas (e.g., primary and secondary), and DataCom antennas (e.g., primary and secondary). Each of the wayside units 130 may be configured as an anchor—e.g., for installation on structures near the tracks, such as tunnel walls, signal posts, etc., and may comprise UWB radios, DataCom radios, and components for supporting interactions with wayside message interface (WMI), solid-state interlocking controllers (SSIC), axle counters, data communication system (DCS) (e.g., Ethernet switches, routers, fiberoptics and electrical cable), servers (e.g., diagnostic interface, non-vital messaging), automatic train supervision (ATS) systems, interface servers (e.g., for handling translating ATS messages), etc. The wayside units 130 preferably may be configured with uninterruptible power supplies.

In some implementations, multiple carborne units 120 may be deployed within a single train. In such instances where multiple carborne units 120 are deployed on a single train, typically no more than one carborne unit is deployed within each car, and preferably a number of cars (e.g., 4 car) may be grouped together, with one carborne unit being deployed to serve each such group (or alternatively, two units, with one unit at the front of the first car in the group and the second unit being deployed at the back of the last car in the group).

Further, in such instances where multiple carborne units 120 are deployed on a single train, one of the carborne units 120 may be configured as lead (or main) unit, with the remaining units being configured as "passive" units, communicating only with the each other and the lead unit—i.e., not handling interaction with other systems, on or off the train. For example, the carborne unit 120 deployed in the main engine cab, where it may be used by the train operator, may be designated as the lead unit. Thus, the lead carborne unit may automatically detect that the cab is the one in control of the train (e.g., via a wired interface to the train cab control panel), and in such manner determines that its cab is the lead unit.

The carborne units 120 may be configured to communicate with one another via wirelessly (e.g., using PTCS-2/ UWB based communications). This may be the case even in instances where multiple carborne units 120 are deployed on a single train as it reduces installation cost (by eliminating the need for wired connections between the carborne units). The communications between the carborne units may be done using direct wireless connections between these units, and/or by utilizing other devices (e.g., the wayside units/ anchors) to relay data between the carborne units. For example, the carborne units may be configured to communicate wirelessly using the data communication radio (PTCS carborne-wayside link) on the train to the wayside data communication radio, which then relays the messages to the addressed carborne unit, whether on the same train unit, the other unit on the same train, or train-to-train communications to other trains operating in the system. As such data links may already be in use in the PTCS-2 based systems, there would be no additional cost for supporting such intra-car and inter-car link communications.

In some instances, PTCS-2 based systems implemented in accordance with the disclosure (e.g., the PTCS-2 based system 100) may be configured for supporting interactions with existing infrastructure and/or systems—e.g., railway signaling systems 140, on-train systems 150 (e.g., sensors such as wheel tachometers, brake systems, etc.), radiofrequency identification (RFID) systems 160 deployed on (or near) tracks and used for safety, etc.

However, in some implementations, some of the interfaces to some of the systems may be eliminated, as the functions PTCS-2 based components may be simplified— e.g., providing only UWB ranging related functions, and as such omit the need to interacted directly with other components in train and/or with non-UWB devices external to the train (e.g., wayside RFID based devices). In such implementations, the PTCS-2 based wayside units may be configured as UWB anchors (as described in more details below), thus eliminating the need to interact with sensors (e.g., tachometers) and/or the wayside/track based RFID systems 160.

In some instances, PTCS-2 based systems implemented in accordance with the disclosure (e.g., the PTCS-2 based system 100) may be configured for supporting interactions with other communication networks. For example, as shown in FIG. 1, the PTCS-2 based system 100 may be configured for supporting communication with (e.g., reception of) satellite signals, such as signals transmitted by positioning satellites (e.g., global positioning system (GPS) based satellites/signals).

In some instances, PTCS-2 based systems implemented in accordance with the disclosure (e.g., the PTCS-2 based system 100) may be configured for supporting temporary connections (wired and/or wireless) with portable equipment (PE) 180 (e.g., laptops, etc.), which may be used, e.g., for performing such tasks as commissioning, provisioning, and diagnostics in conjunction with the carborne units 120 and/or the wayside units 130.

As noted above, the core technology utilized in PTCS-2 based system is low-cost communication technology, preferably ultra-wideband (UWB). Use of UWB technology may be desirable as it allows for broadcasting signals over a wide bandwidth, which offers signal transmission that is virtually unaffected by multi-path distortion, which substantially affects signal integrity in conventional narrow band signals in certain areas that may be particular prevalent in transit systems, such as subway tunnels and urban environments.

UWB-based PTCS-2 solutions may also benefits from using a coherent signal processing approach where trains of pulses integrate the energy from many pulses in increase the signal to noise ratio and extend range and accuracy. For example, use of UWB-based communications may allow for operations at ranges over one half of a mile, and with sub-inch distance accuracy over such range, in either in open air or difficult tunnels environments.

Figure 2:
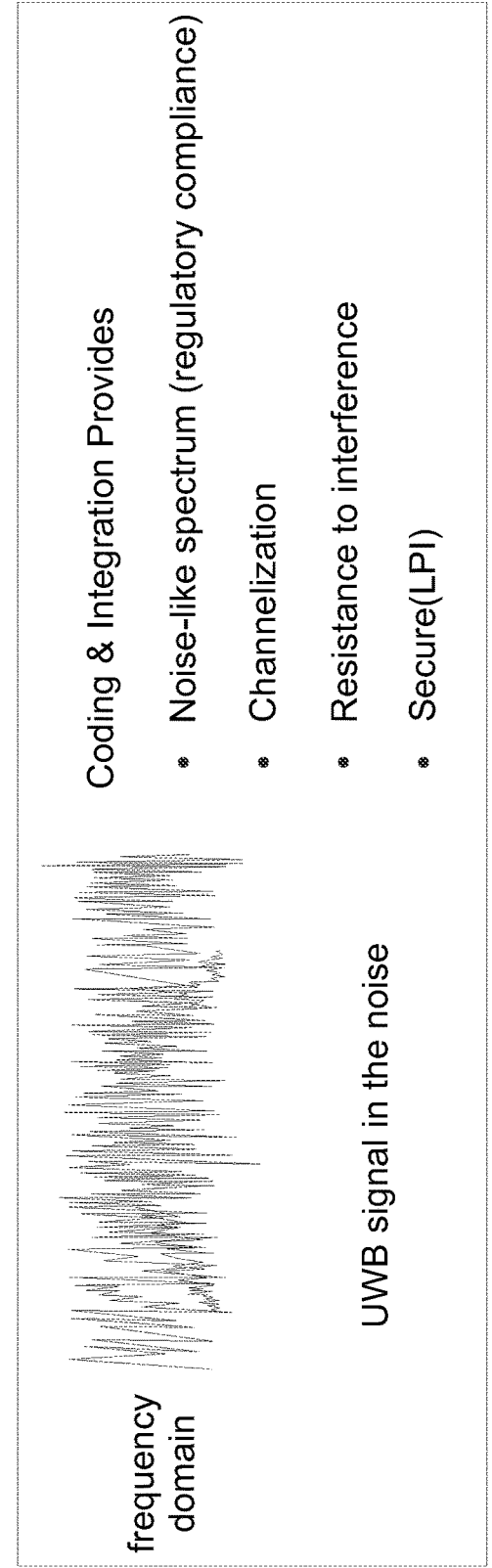
FIG. 2 illustrates an example output of frequency analysis of ultra-wideband (UWB) signals during example use in a train control system, in accordance with the present disclosure.

The UWB-based approach may also benefits from having a low probability of intercept (LPI), as the transmit power allowed by the FCC (Federal Communications Commission) is similar to ambient noise floors such that the signal is essentially invisible to a frequency analyzer as shown in FIG. 2. In this regard, FIG. 2 illustrates a chart 200 corresponding to an example output of frequency analysis of UWB signals during example use in a train control system, in accordance with the present disclosure.

Figure 3:
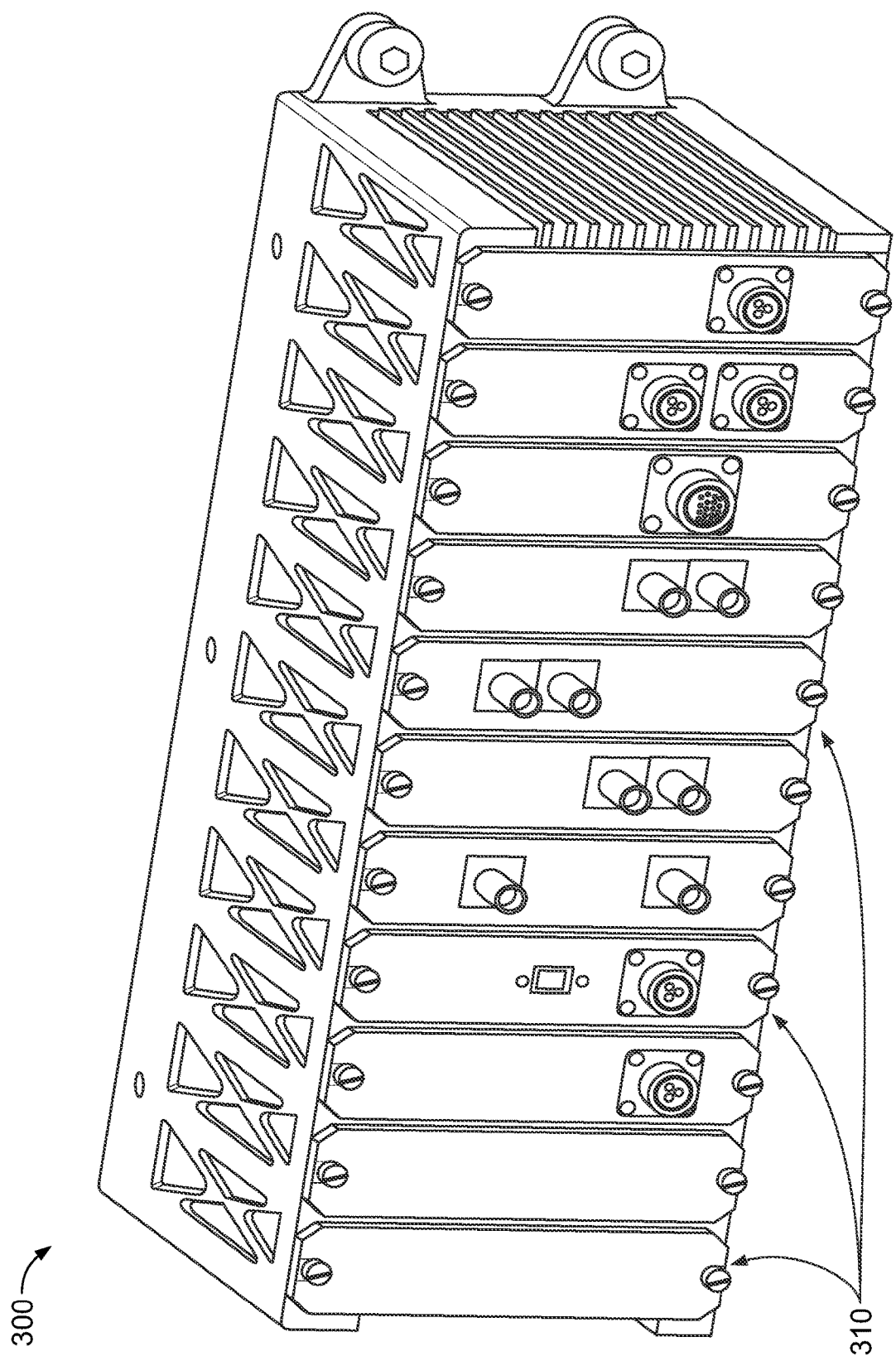
FIG. 3 illustrates example carborne unit for use in a train control system, in accordance with the present disclosure.

FIG. 3 illustrates example carborne unit for use in a train control system, in accordance with the present disclosure. Shown in FIG. 3 is an example chassis-based implementation of train-borne (or carborne) unit 300.

The carborne unit 300 may be a rack based unit, containing one or more swappable modules 310, configured such that it may be mounted in or close to a cab of a train. Each of the modules 310 may comprise suitable circuitry for supporting particular functions.

Example modules that may be included into the carborne unit 300 may comprise main control module (MCM), which may comprise control circuitry for system, GPS (Global Positioning System) controller module (GCM), which may be used for calibration of wheel sensors, verification of other speed measurement systems, and precise updates of the real-time clock when exposed to a satellite link; ranging module (RGM), which contains redundant UWB ranging radios; data communication module (DCM), which is used for providing redundant data channels (e.g., over spreadspectrum links); operator interface module (01M), which is used for the operator interface display; personality controller module (PCM), which is contains all interfaces unique to agency such as speed sensor inputs; host interface module (HIM), which is the emergency braking interface and bypass control unique to the agency or vehicle; the service brake module (SBM) which is the service braking interface unique to the agency or vehicle, RFID reader module (RRM), which is the RFID reader interface; power supply module (PSM), which supplies power to rack; and optionally such other modules/components as lidar, radar, worker protection modules.

A modular rack design may allow for accommodation of variations in requirements (e.g., between different transit agencies) and/or unique train interfaces, with minimal changes to hardware and software, such that changes to safety certifications are minimized. The other advantage of this approach is modular upgrades in that an agency may start with a basic safety system and add capabilities though additional module additions at a later date when budgets allow.

In addition to the chassis, other on-train components may be used, such as antennas. For example, one or more antennas may be deployed, such as on the outside of the train, including a redundant-single package UWB-GPS antenna, a data communications (DataCom) antenna (or dual-version for diversity or redundancy), and an optional RFID antenna. The antennas may be configured as and/or may have low profile design, cognizant of the size and space restrictions present.

Additional on-train components may include wheel sensors—e.g., wheel odometry inputs which may be furnished either by integrating into existing sensors, or by installing new wheel sensors. To ease the installation costs of wiring wheel sensors, the system is able to operate with only UWB ranging.

The system may include a user interface—e.g., user interface may be specified by the agency. The information displayed is also customer specific. A bypass switch—e.g., a system bypass control may be included, and may be integrated into an existing panel or supplied in its own enclosure; and an optional an RFID tag reading system, which may be used as parallel method for determining track occupation, as well as for temporary speed restrictions and work zones. However, the RFID functions may be provided by UWB-based track determination, and speed restrictions and work zones communicated via the data communications wireless interface, thus eliminating the need for the additional RFID equipment and installation effort.

Figure 4:
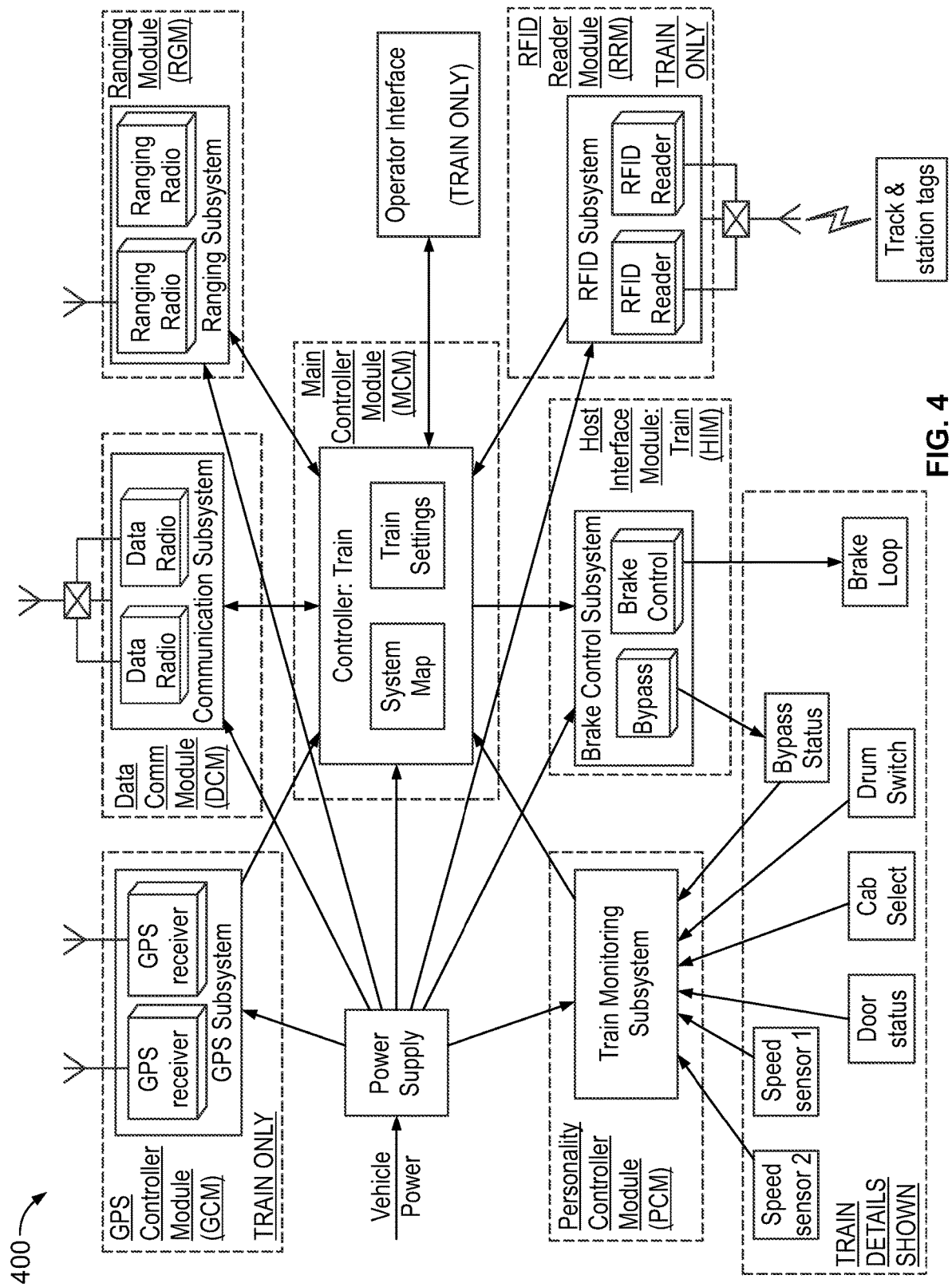
FIG. 4 illustrates an example block-based implementation of train control system, in accordance with the present disclosure.

FIG. 4 illustrates an example block-based implementation of train control system, in accordance with the present disclosure. Shown in FIG. 4 are the major components (represented as blocks), such as the modules and other components described with respect to FIG. 3, as well as interactions therebetween and/or functions performed thereby, in an example implementation of train control system in accordance with the present disclosure. However, some of the components, functions, and/or interactions shown in FIG. 4 may be eliminated in some implementations. For example, in some example PTCS-2 based implementations, the PTCS-2 systems may not include any speed sensors (thus eliminating these components/blocks as shown in FIG. 4, within the "Train Details Shown" block). Also, in some example PTCS-2 based implementations, the PTCS-2 systems may not include any RFID tags (thus eliminating the "RFID Reader Module" component/block shown in FIG. 4). Also, in some example PTCS-2 based implementations, the PTCS-2 systems may also include a serial link or other communications link-based service brake interface, in addition to the simple (vital) brake loop interface shown in FIG. 4.

Figure 5A:
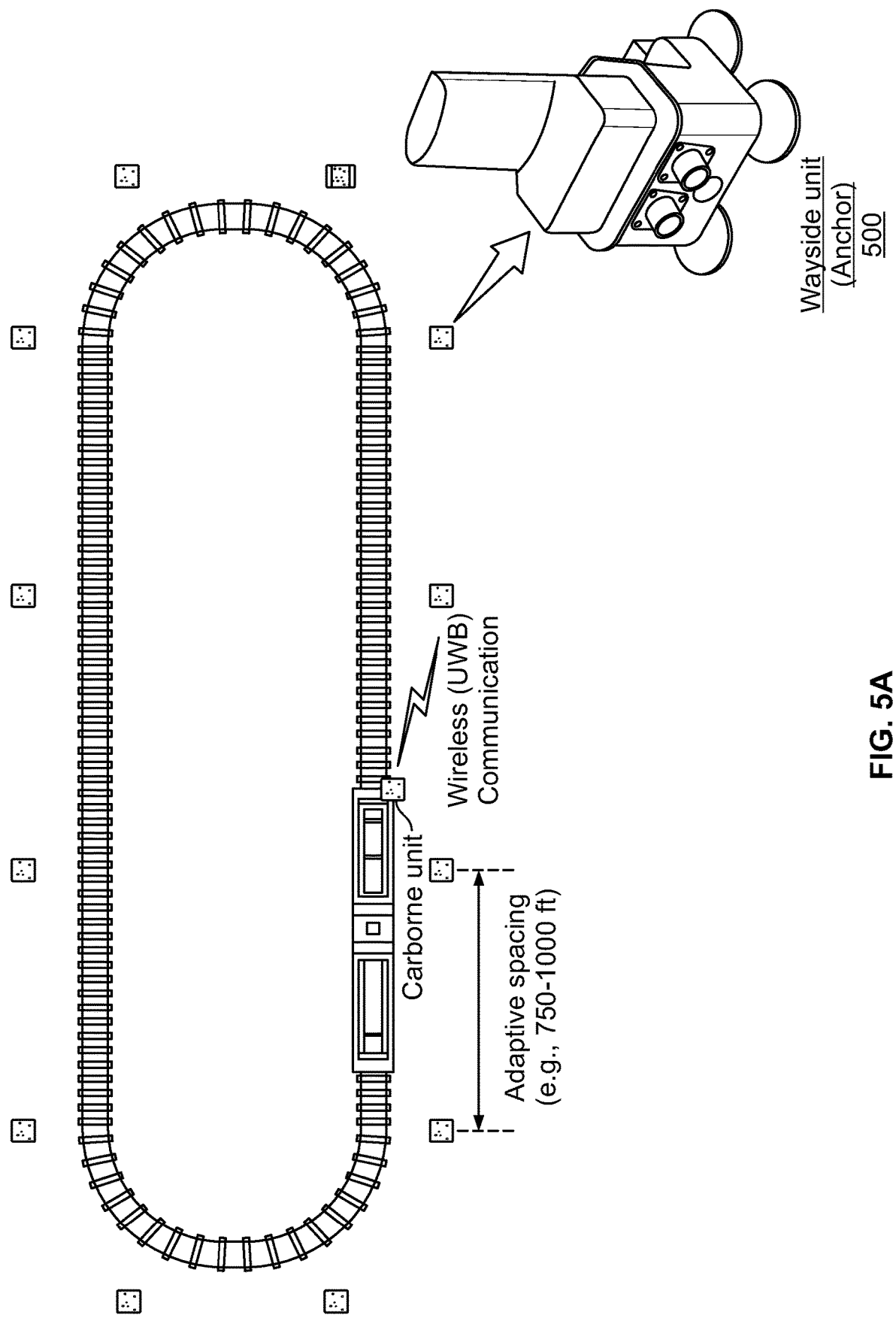
FIGS. 5A-5C illustrate example wayside unit and an example deployment of such units in a train control system, in accordance with the present disclosure.
Figure 5B:
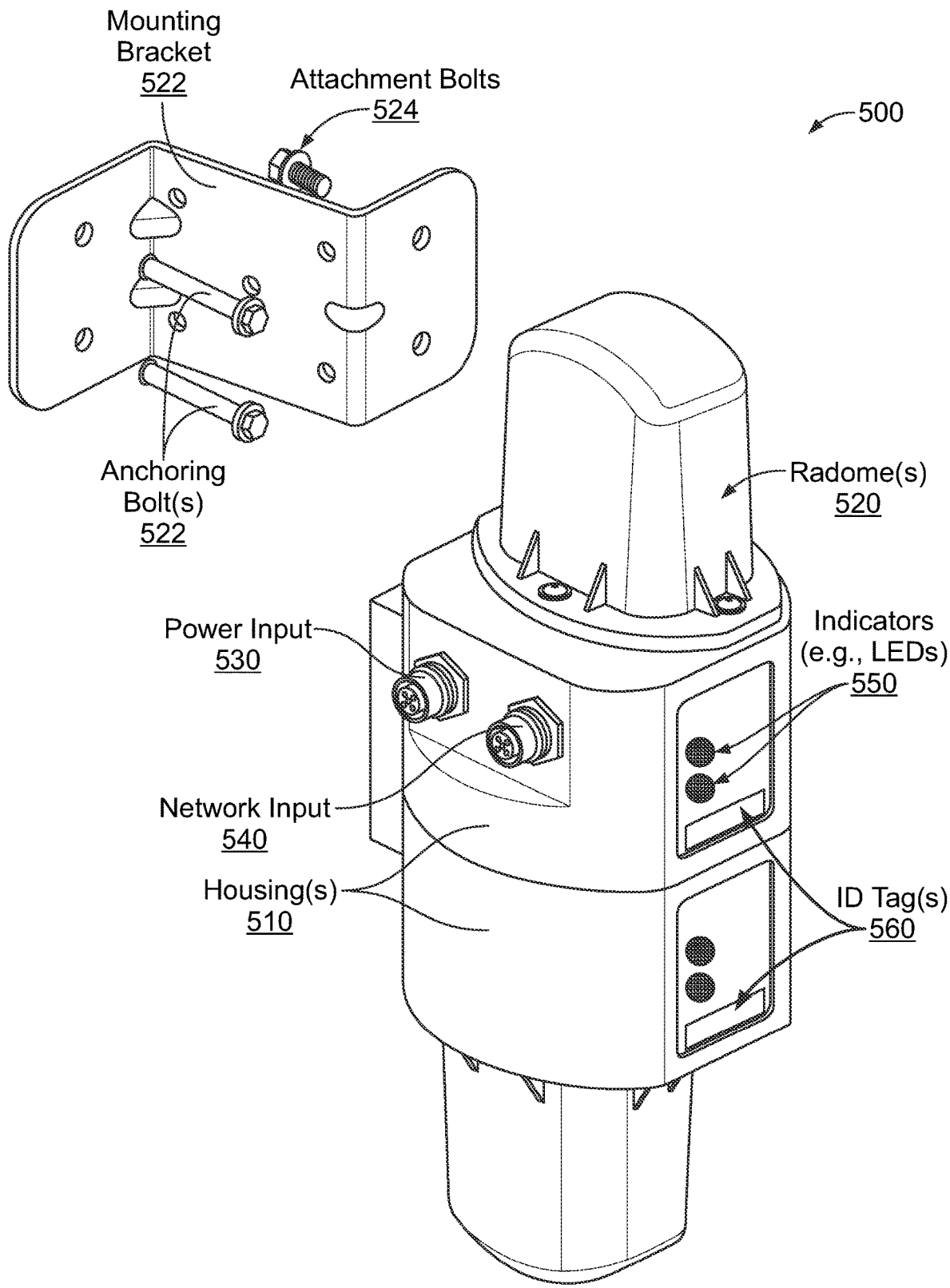
Figure 5C:
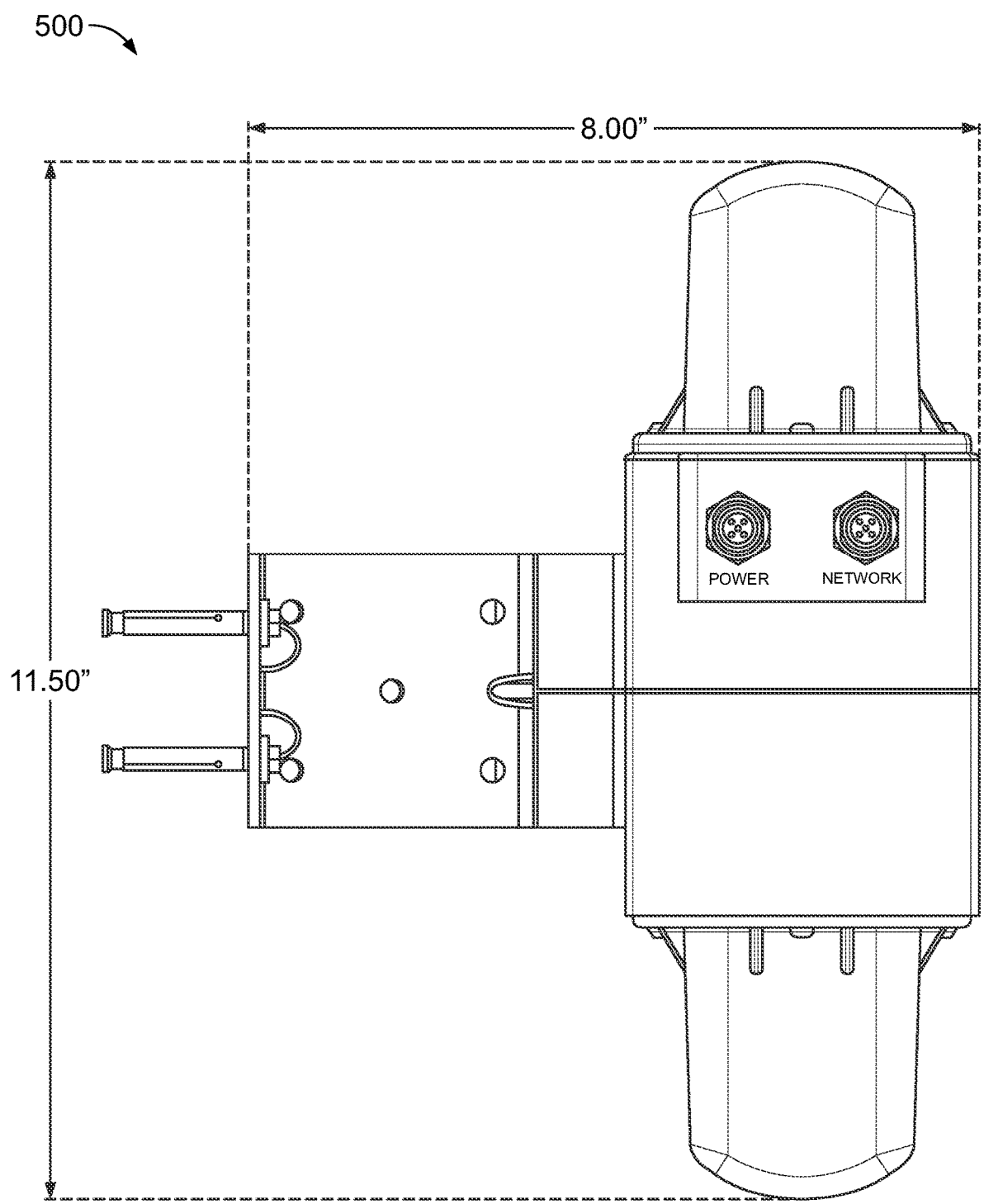

FIGS. 5A-5C illustrate example wayside unit and an example deployment of such units in a train control system, in accordance with the present disclosure. In this regard, shown in FIG. 5A is an example wayside unit (or anchor) 500 and an example deployment of a number of such anchors in relation to tracks (using a simplistic loop track for illustration purposes) in an example transit system.

The anchors (or wayside units) may comprise suitable circuitry and related components (e.g., radios, antennas, etc.) for supporting communicating in particular manner, specifically UWB transmissions (ranging) with the train—e.g., PTCS-2 based carborne units deployed thereon. In some instances, anchors (e.g., anchor 500 as shown in FIG. 5A) may support and accordingly circuitry (and related components) other forms or types of communications, beside UWB ranging related communications. For example, an anchor (e.g., anchor 500 as shown in FIG. 5A) may comprise at least two wireless systems: one for UWB ranging and the other optimized for high-speed data transfer (e.g., DataCom), being configured to spread spectrum transmissions for data communication (thus enabling communication of large size data).

Alternatively (and preferably), the anchors may be configured as solely UWB ranging based devices, with separate devices handling the data communications (e.g., DataCom anchors). In such implementations, the UWB ranging anchors may be connected to the DataCom anchors, to use them to communicate with other components in the transit system and/or to facilitate large data transfers. Such design may be preferable as it would allow for use and deployment of larger number of UWB anchors compared to DataCom anchors (or devices).

The anchors may be integrated (directly and/or via other devices, such as dedicated DataCom devices) with signals, position location, data relay devices, and interlocking interfaces. Anchor design is generally customized for the agency taking into consideration such as power availability, size constraints, integration with existing assets and functionality.

The anchors communicate with each other by "hopping" data from anchor to anchor, either wireless data hopping using primarily the data communications radios, or for increased data throughput, via a cabled interface such as fiber optic Ethernet. The anchors may also perform UWB ranging to each other, for diagnostic purposes, allowing mounting location integrity checks. The anchors support wireless communications from anchor to train as well, with all communication being bi-directional. Anchors may also interface external to the line by using gateways located at stations for cloud based communication. Placement of anchors is dependent upon the geography along the track, and the various features (subway with smooth walls, subway with "castellated" walls, open air, etc.).

The anchors may be spaced to ensure optimal performance, such as based on pertinent factors—e.g., the layout of the transit network (or parts thereof), presence of nearby structures, etc. For example, the anchors may be spaced between 300-1,000 feet. The data communication anchors (if any) may be spaced even more (e.g., between 500 and 1,500 feet), as fewer of them are needed.

An example implementation of the anchor 500 (particularly when implemented as UWB ranging anchor) is illustrated in FIG. 5B. In this regard, as shown in FIG. 5B, the anchor 500 may comprise housing(s) 510 for enclosing various components of the anchor 500. The housing 510 may be constructed to be suitable for the intended operation environment and/or conditions of the anchor 500 (e.g., being constructed to be very rigid, to withstand accidental impacts during deployment and/or when it knocked down), and to withstand environmental conditions associated with outside/external use (e.g., rain, extreme cold/heat, etc.). For example, the housing 510 may be construed from coated aluminum. The anchor 500 may also have radome(s) 520 (constructed from, e.g., polycarbonate material), which may be attached to the housing(s) 510. The radome(s) 520 may be used to enclose components that may need to be implemented external to the housing 510, such as antennas, used in wirelessly transmitting and/or receiving signals, such as during UWB ranging related communications with PTCS-2 based carborne units).

The anchor 500/housing 510 may incorporate a power input (connector/port) 530, which may be used in connecting the anchor 500 to power source (e.g., the power grid) to power the anchor 500. The anchor 500/housing 510 may also incorporate a network input (connector/port) 540, which may be used in connecting the anchor 500 to one or more wired-based networks (e.g., fiber). In this regard, the power input 530 and the network input 540 may be implemented adaptively to optimize performance. For example, the power input 530 and the network input 540 may use M12 connectors. In this regard, the power input 530 may utilize, for example, an A-Code connector, while the network input 540 may utilize a D-Code connector to prevent mismatching during installation.

The anchor 500/housing 510 may incorporate means for providing indications or other information. For example, indicators (e.g., LEDs) 550 may be incorporated into the housing 510, and may be configured to convey/indicate certain information (e.g., UWB radio status). Further, identification (ID) tag(s) 560 may be affixed/overlaid on a part of the outside of the housing 510, showing identification number(s) of the anchor 500.

As noted, the anchors may comprise or be coupled to support structures, to enable placement or installation of units. For example, as shown in FIG. 5B, the anchor 500 may installed using a mounting bracket 520, which may be configured to attachment to the anchor 500 (e.g., via attachment bolts 524) on one side, and for anchoring on a structure (e.g., wall, via anchoring bolts 522, for example) on the other side. For example, the attachment bolts 524 may be ¼-20 bolts, whereas the anchoring bolts 522 may be ¼-20 concrete anchor bolts.

Support structures, such as the mounting bracket 520, may be configured for unique mounting environments and/or to accommodate particular mounting/installation requirements. For example, the mounting bracket 520 may be configured to allow mounting the anchor 500 in particular manner—e.g., being structured such that it allows mounting the main assembly (the housing 510) at particular distance, such as 8", from the wall where it is to be mounted. Further, the mounting bracket 520 may incorporate holes for allowing for cable management and tie-down straps, thus ensuring that when the cables are connected, they should not inhibit the line of sight of the antennas. FIG. 5C illustrates the combination of the anchor 500 and the mounting bracket 520 attached together.

A description of operations in an example implementation of a train control system in accordance with the present disclose (e.g., the system described with respect to FIGS. 1-5) is now provided.

In operation, the PTCS-2 based system initially runs through a self-checking protocol, confirming all aspects of the hardware and software are present and communicating. As the train leaves a yard or storage facility, the PTCS-2 based system may also self-check that the UWB ranging system, the data communications system, optional RFID, and optional wheel odometer systems are also functioning within specifications.

The operator may choose a route which is stored in train-borne (or carborne) equipment/unit, or in centralized control configurations, the route is chosen remotely by the central dispatcher using Automatic Train Supervision (ATS). The route is communicated to the train using the wireless data communications system. This information includes route number, and other schedule-related information.

As the train progresses, the train position and speed are determined by the train by ranging with wayside UWB anchors. As a train passes, it is able to determine its absolute location by the ID number of the anchor and referencing the distance to that anchor with the on-board track map stored in non-volatile memory. The train may also determine the speed and direction of movement by measuring the UWB ranging delta separation data of the radio signal from the train to the UWB anchors.

Train separation may be measured by the wayside anchors recording the time and speed at which a train passed, and forwarding this data through each end of the network by "hopping" the data from anchor to anchor to other trains in the system. This information is stored on the anchors or on centralized computing devices, and transferred to trains as they pass through an area. For decentralized control, train separation is determined by the train obtaining the train IDs in the area from the Wayside Messaging Interface (WMI), and then directly interrogating those trains to determine their location using the data communication network. The train will then act on this information by determining if is safe to continue moving forward, as well as the maximum allowable speed, giving the operator feedback on the user interface. The allowable speed is based upon various items, such as the normal allowable speed limit on the track at that location, any speed temporary restrictions or work zones, the path which the train is programmed to take (switches may require slower operating speed, for example), and by ensuring that the worst case safe braking distance at the determined speeds and directions of both trains which will allow the train to stop before reaching the train ahead.

At interlocking points, the train will interrogate the switch via the wireless data communications system to determine its status, whether it has priority, and if required, trigger operation and receive confirmation of proper switch lining. The system may use both UWB-based and data-communication channels for this interrogation. For example, the status inquiry may be performed via intermediate vital "data clearinghouse," using Wayside Message Interface (WMI).

At stations, the system may perform berthing control (ensuring proper alignment of the train at a station), integrating with door controls, adjust route schedules by maintaining timetables and where required. In addition, the system may be configured to perform at a station (or other location) that corresponds to the end of the line, end of line protection. Further, At stations, or other convenient interfacing locations, data gateways may be implemented to enable remote monitoring and control of the system, connecting the data hopping network (whether wireless or cabled) to remote servers.

Worker protection is accomplished through this system in at least two variations. One means is for track workers to wear either a vest in which the warning system is built-in, or a small module (mobile anchor device) equipped with an UWB based warning device. This UWB device communicates with and/or ranges with the UWB anchors along the track. The detected presence of the track worker(s) is communicated along the data hopping network to other anchors which allow wireless communication of the presence of workers to the train Operator and the train control system (to allow automatic reduction in train speed). In some implementations, an approaching train triggers a warning for the workers through a visible, audible and vibratory warning on their worker worn device. In another variation, the workers have no special worn devices, and instead are warned by visible and audible warnings from a companion device the workers place in their work zone. In yet another variation, work zones are centrally designated and warning devices are incorporated in the wayside anchors, warning the workers by visible and audible warnings when a train is approaching.

When a train approaches a work zone, whether the zone was centrally designated or automatically detected by wayside or worker-worn devices, the train operator is warned through the train-borne user interface that a worker is present. When workers wear individual devices, the operator may also receive notification of how many workers are present, and if the workers have acknowledged their alarms. This system will also warn and enforce a work zone speed limit automatically when encountering workers. Work or slow zones may also be established temporarily by deploying specific RFID tags (if used by the system) which will notify approaching trains as the train passes the RFID tag. Finally, work or slow zones may also be established by the dispatcher in a remote location using the ATS console, where the data is communicated via the data communication network.

The PTCS-2 based system is designed to be integrated with an operator, who performs normal manual train control, as with the legacy system, however, nearby trains, signal aspects, speed limits, worker protection zones, and interlocking data will all be shown on a customized user interface according to the agencies preferences. The operator will receive warnings when safe operating violations are imminent, offering the operator a chance to rectify the situation. If the operator fails to react appropriately, the PTCS-2 based system will interrupt current operation, and either apply a penalty stop, or reduce speed using the train's service brake. In the event of a penalty stop, the operator must acknowledge the event on the user interface, then may resume normal operation once the PTCS-2 based system has determined it is safe to proceed. The enforcement event will is logged in the integral data recorder for training and or event re-construction.

In some instances, such as in conjunction with vital functions—i.e., functions that are configured for operating a fail-safe manner, implementations, the PTCS-2 based system may interface with emergency brake systems. For example, in the event the train fails to slow sufficiently or quickly enough to ensure safe operation using the train's service brakes, the emergency brake system may be triggered. Once the emergency brake is triggered, the train will come to a complete stop. The operator must initiate a reset procedure on the train, and it must be safe to proceed before normal operation of the train may be resumed. The emergency brake interface uses a simple, fail-safe, redundant relay contact interface to maximize reliability and safety.

Regarding interfacing with existing systems, with respect to the train-borne (or carborne), the PTCS-2 based system may be configured for minimal installation impact on the railcar by limiting the interfaces to the railcar. In an example implementation, the vehicle interfaces may consist of fifteen wires as follows: power supply (two wires, power and ground); wheel sensors—e.g., wheel speed/wheel slip detection (two interfaces, two wires each); direction status—e.g., forward/reverse (one wire); cab enable—e.g., whether the cab is in control or in standby (one wire); direction/cab enable ground (one wire); drum switch—e.g., end or middle car detection (two wires to a switch closure); braking system (two interfaces, one to the propulsion loop, the other to the braking loop, two wires each). In another implementation, automatic train operation interface may also be used, which may enable controlling propulsion in the train. Nonetheless, in some implementations, the PTCS-2 based system may incorporate simplified interface related functions—i.e., may use less interfaces and/or some of the interfaces may be simpler than described above. For example, in some implementations, such interfaces as wheel sensors, direction status, and/or drum switch interfaces may be eliminated. This may be made possible by using the UWB based function to detect or obtain information relating to train speed, direction of movement, and detection of train consist (number of cars).

In some implementations, to initiate the full-service brake, the PTCS-2 based system merely drops the drive to its brake loop and propulsion loop relays, causing the relay contacts to open, which in turn interrupts the braking and propulsion loops on the railcar. A PTCS-2 based system brake initiation appears to the system in the same manner as an open wire in the brake and propulsion loops.

In some implementations, the service brake interface is a data communications bus, such as LonWorks, or Ethernet. In these implementations, the braking rate may be controlled, resulting in improved passenger comfort. For example, in an overspeed condition, the propulsion drive may be removed, and a 30% braking effort applied until the train drops a configurable amount below the allowable speed (such as −2 mph). Then the propulsion control will revert to manual operator control. In a penalty stop condition, a 70% braking effort may be applied, and then the braking effort reduced significantly as the train slows to several mph, allowing the train to stop gently rather than abruptly (or "flare out", as known in the industry).

In some implementations, the PTCS-2 based system may also provide sophisticated braking rate compensation abilities to ensure that when hazards are detected, the system applies the brake in a timely manner. The following factors are considered when determining the point at which brakes are triggered: range distance to the hazard; speed and direction of travel of the host railcar; if the hazard is another railcar, the speed and relative direction of travel of the other railcar (approaching or receding); the braking curve characteristic of the host railcar; the grade of the track; degraded mode operation of the host railcar; (if specified) the track conditions (if wheel slip has been detected, the stopping distance required is extended by an agreed upon margin). Additional compensation factors may include an allowance for the delay in speed measurement detection, the cycle time for vital logic processing, maximum data latency (delays in data delivery), the time delay for output transition of the relay or communication bus, a time delay for propulsion removal, and the time delay for brake activation and braking force brake build-up. Each of these potential delays require enforcement actions to begin earlier, or further away than otherwise necessary Another compensation must be made for possible "runaway acceleration". In a worst-case scenario, the train could begin maximum acceleration immediately after the current speed is sampled and the processing system calculates from that and other data that the train must brake. The total time delay during this data acquisition, decision, and execution process may result in the train traveling faster than the original speed measurement has indicated. The runaway acceleration compensation assumes that this maximum acceleration has occurred during the execution process to ensure that the train will be capable of stopping prior to a hazard.

The objective of this system is to apply the brakes only when necessary, and only at the point appropriate for the position and operating conditions. Aspects which increase the anticipated stopping distance include: increased speed of the railcar; another railcar is moving towards the host railcar; railcar(s) operating on a downward grade; railcar(s) braking system degraded, resulting in reduced braking rate; wheel slip has been recently detected.

The braking curve of the railcar has a significant effect on the distance at which braking is initiated. Factors in the normal service braking characteristics include: nominal braking curve, mode change delay, jerk limit, and wheel slip. In this regard, with respect to nominal braking curve, if the braking rate is not constant over (such as 3.5 mph/sec), then the braking rate is broken into zones of differing rates for various speeds. In a simple case, for example, the braking rate is constant over the entire range of operating speed except at low speeds, such as below 4 mph, where a slower braking rate occurs (due to the loss of effective regenerative braking action).

With respect to mode change delay, the railcar braking system may delay the application of brakes by a fixed time interval. This delay is considered in normal service braking distance calculations. If the railcar is accelerating when the trigger point for braking is reached, there will be two mode change delays: accelerating to maintaining speed, maintaining speed to braking. This adjustment of the braking distance is part of what is called "acceleration compensation". If the railcar is already braking at the time automatic braking is triggered, there will be no mode change delay.

With respect to jerk limit, the railcar service braking system may delay the full application of brakes by application of a jerk limit, such as 3 mph/(sec×sec). The additional delay of the jerk limit factor is also considered for the stopping distance. If the railcar is accelerating at the time of automatic brake application, there are two jerk limit delays which will be added to the braking distance. This is the second part of "acceleration compensation."

With respect to wheel slip, if desired, an additional stopping distance margin may be applied in conditions where wheel slip has been detected recently. Wheel slip may be detected by monitoring multiple independent wheels for speed variations during braking and acceleration. With installations that don't have wheel sensors, wheel slip may be detected by comparing the commanded braking rate to the actual deceleration of the train. The additional stopping margin is not normally applied to prevent the PTCS-2 based system from braking too conservatively and applying the brakes before the operator would normally begin braking. In some instances, the PTCS-2 based system may be configured such that if the call for braking is removed (e.g., by closing the relay contacts), normal control of the vehicle returns to the operator.

PTCS-2 based systems may be configured for optimized power consumption. For example, in some implementations, the train-borne (or carborne) unit and/or the wayside anchor may be implemented to utilize low power. Further, various functions may be disabled when not used. The PTCS-2 based systems may allow for adjusting power consumption, such as based on user preferences, available power supply, etc. Further, PTCS-2 based systems may be configured such that the systems may be adapted to and/or may integrate any available wireless design. Anchor electronics may interface with either an integral design or a supplemental enclosure containing anchor electronics.

In an example implementation, PTCS-2 systems may be configured for supporting UWB ranging related functions. In this regard, PTCS-2 equipped train may be configured (e.g., via its PTCS-2 based carborne unit) for collecting and updating range data for all relevant targets, such as through a cooperative process initiated by the PTCS-2 based carborne unit to one specific target at a time. The UWB ranging may comprise determining ranges based on UWB signals, with the range between a UWB transmitter and receiver is calculated as the time of flight between the transmitter and the receiver (one way) multiplied by the speed of light. UWB ranging may be used in different use scenarios.

For example, UWB ranging may be used for determining location, such as by collecting ranges between a transmitter and at least three receivers, the PTCS-2 based carborne unit may use trilateration to determine relative location of the transmitter when multiple tracks are present. If the location of the receivers is fixed and known, this information can be used to determine the absolute location of the transmitter. In certain conditions, the operating track may be determined using only one anchor, such as where the train passes the anchor at a relatively slow speed. This may be possible, for example, if the anchors for the other tracks are much further away, such as on the opposite side of the other track. Thus, as the train passes the anchor, if the shortest distance measured to the anchor is under a certain value, the train may detect that the anchor identified is associated with the train's operating track (e.g., from a track map).

UWB ranging may also be used for determining speed (or velocity), such as by taking multiple range calculations over a specific time period, thus allowing the distance traveled by the UWB transmitter to be determined and used to calculate the velocity of the UWB transmitter (or an object that includes that UWB transmitter). Speed (or velocity) and location determination from UWB ranging may be checked against, and in some cases processed with, speed and location determined via other mechanisms in order to establish vital train location, speed, and direction.

In an example implementation, PTCS-2 systems may be configured for supporting anchor location related functions. In this regard, PTCS-2 equipped train may be configured (e.g., via its PTCS-2 based carborne unit) for locating anchors (or wayside devices). In this regard, as noted above, PTCS-2 based train control systems may incorporates anchors as wayside devices, with these anchors being installed along to track. The anchors may be installed at distances determined by the topography of the track at any given location—e.g., anchors may be installed closer together around a curve then they will be on a long straight section of track. The anchors may be used primarily as fixed points for UWB ranging for the purposes of location, direction, and speed determination.

In an example implementation, PTCS-2 systems may be configured for supporting train control system operation related functions. In this regard, PTCS-2 equipped train may be configured (e.g., via its PTCS-2 based carborne unit) for determining its position using UWB functions—e.g., by using frequent UWB range measurements between an UWB radio of the PTCS-2 based carborne unit (e.g., installed at the front of the train) and fixed UWB anchors (serving as, e.g., absolute references) along the track. For example, the distance to particular anchor may be measured using two-way time of flight timing measurements. Train reports and queries may be routed via the DCS wireless link, such as to other wayside devices and/or system servers, such as the ATS console for train tracking.

In various instances, trains may report such information as position, speed, direction of travel, and health status to a central server, and may do so periodically—e.g., approximately every second. In some instances, PTCS-2 equipped trains may be configured such that PTCS-2 based carborne units (particularly the lead units) of each train queries the server to determine the nearest PTCS-2 equipped train ahead. The PTCS-2 based carborne units (particularly the lead unit) cab of each train queries the train ahead using vital messaging protocol, confirming its position and length, and queries the appropriate solid-state interlocking controllers (SSIC) to confirm the wheel count for the zone ahead matches the reported occupancy. The lead cab also determines the limit of the safe route ahead from the SSIC interrogation.

In an example implementation, PTCS-2 systems may be configured for supporting train control commissioning related functions. For example, following the installation of the PTCS-2 based train control system, the PTCS-2 based carborne units may be commissioned with train-specific data. For example, the car number hosting each PTCS-2 based carborne unit is stored into the unit (e.g., entered into non-volatile memory of that unit). In addition, the companion car number from the opposite end of the unit may also be stored. In this manner, the PTCS-2 based carborne units on each end of a unit may know the car number of the other cab which part of the semi-permanently coupled multi-car unit.

In an example implementation, PTCS-2 systems may be configured for supporting train control initialization related functions. In this regard, when a PTCS-2 based train control system is first installed or is initialized, the system may have no awareness of such information as location. This may occur at power up and may potentially occur due to other events during operation, such as where multiple anchors are not responsive. Thus, train control initialization may be performed, where the PTCS-2 based carborne unit may send a broadcast UWB message for all UWB devices (e.g., PTCS-2 anchors) within its wireless range, to announce its presence and identification information. Once the UWB responses from the UWB devices (e.g., anchors) are received, the PTCS-2 based carborne unit commences an individual range measurement with each responding UWB device.

For the inner cars of a multi-car train, at least some of the UWB responses will from another car, and not from an anchor (or wayside unit). For example, a PTCS-2 based carborne unit installed on inner car may receive a response from the adjacent cab of the coupled unit, which will include a range measurement and its car number. The resulting range measurement between those UWB devices will be result in short range (e.g., within several feet, with the actual value being dependent upon the mounting location of the UWB antennas). This may allow the PTCS-2 based carborne unit to determine that they are installed on inner cars. In some instances, range results corresponding to anchors may be geometrically compared using the anchor database to determine if the range responses are consistent with a single location along the track (including an acceptable, predefined tolerance). Accordingly, if the range results are consistent for a single location, the train controller's system location state changes from unknown to known. Otherwise, the train control system continues to attempt to find a location solution.

In an example implementation, PTCS-2 systems may be configured for supporting train control initialization: consist length and configuration. For example, once a train controller (e.g., PTCS-2 based carborne unit) determined its location using UWB range measurements to wayside anchors, each cab queries its companion unit cab for its location or the car number of its provisionally identified inner cab. Responses which return inner cab responses result in additional queries to the companion unit cab for its location. When all responses include confirmed locations or inner cab identifications, the geometry of the data is analyzed to determine the provisional consist length. This provisional length becomes an established value when movement is detected (e.g., by changes in location reporting by UWB ranging). If locations have changed and the measured length of the consist is consistent (e.g., cars that appeared to be coupled remain in the same proximity with movement of the train), the train length and car number configuration is established and reported by the respective end cabs. This configuration is periodically verified.

In an example implementation, PTCS-2 systems may be configured for supporting broken consist detection related functions. For example, train controllers (e.g., PTCS-2 based carborne unit) may periodically confirm the integrity of the consist. End cabs query the other end cab in the train consist (e.g., using the wireless data communication system along the wayside) and confirm the reported location is consistent with the expected train length. Inner cabs range to the opposite unit and confirm that the distance is consistent with the expected (short) separation. If a parted consist is detected, each train controller reports its status and position over the DCS.

Figure 6A:
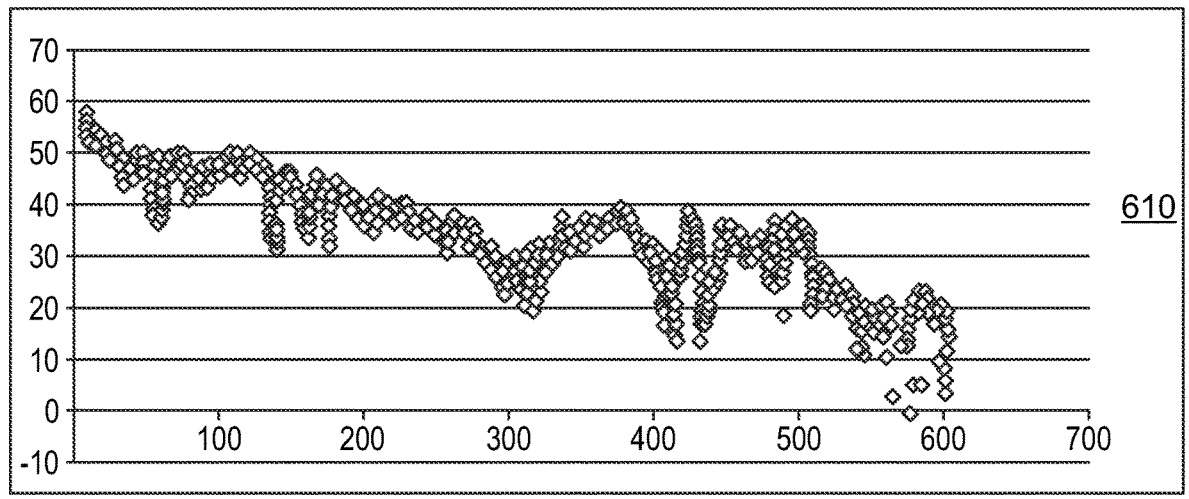
FIGS. 6A-6C illustrate various example performance assessments of ultra-wideband (UWB) communication within an existing transit system, used in a train control system, in accordance with the present disclosure.
Figure 6B:
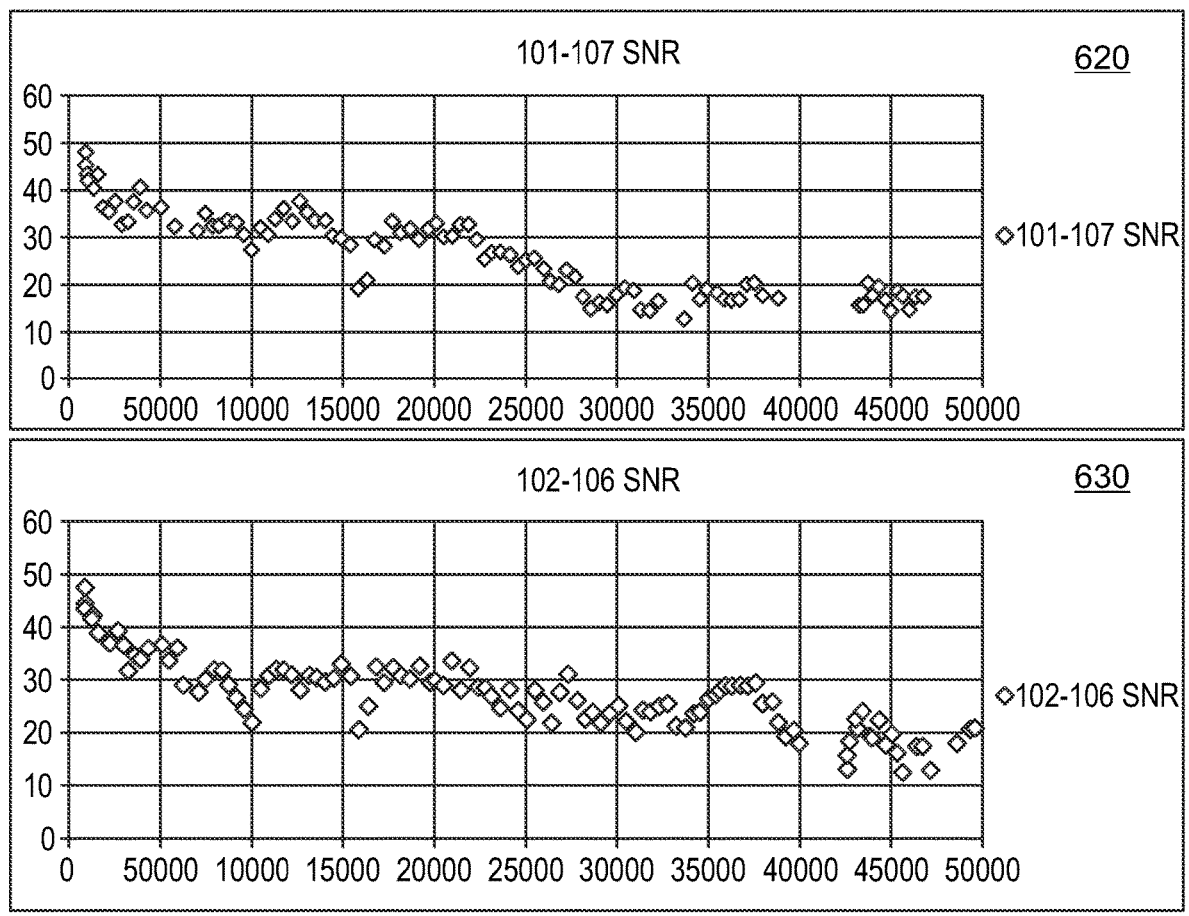
Figure 6C:
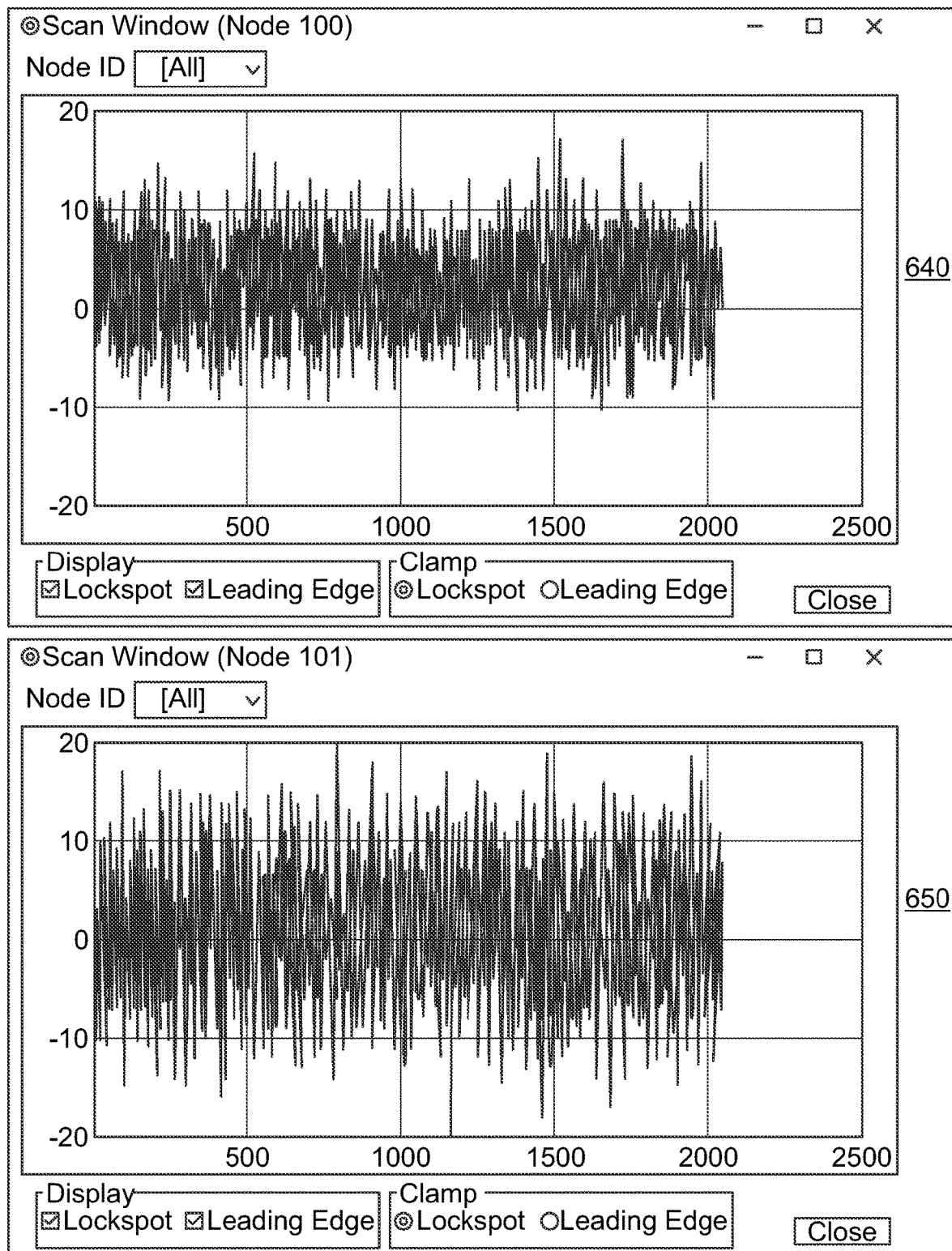

FIGS. 6A-6C illustrate various example performance assessments of ultra-wideband (UWB) communication within an existing transit system, used in a train control system, in accordance with the present disclosure.

As noted above, one of the components (and functions related thereto) in the PTCS-2 based system is UWB precision range measurement radio. Further, UWB radios may be configured for use in data transfers. However, the disclosure is not so limited, and in some instances, other technologies may be used for handling data transfer functions (at least for transferring large amount of data), using other (non-UWB) radios for those functions, with the UWB radios/components being used exclusively for ranging and the minimal data transmissions necessary to support ranging operations. Notwithstanding, as the charts shown in FIGS. 6A-6C illustrate, corresponding to RF surveys performed in intended deployment locations, both above and below ground, enhanced performance may be achieved with PTCS-2 based systems, to confirm that PTCS-2 based solutions may be suitable for the intended applications in transit systems. For example, as illustrated in chart 610 in FIG. 6A, consistent ranges out to about 600 meters or approximately 2,000 feet may be achieved, as shown in the UWB range chart 610.

Further, where UWB is used for communication of data, different messages structures may be used, as illustrated in charts 620 and 630 in FIG. 6B. In this regard, charts 620 and 630 illustrates tests of different message structures to evaluate the difference in the signal to noise ratio between decreased or "short coded" messages and increased message loads or "long code" messages. In this regard, very little difference is detected between the two which allows for improving data back haul performance. Nonetheless, as noted above, non-UWB components may typically be used for data transfer/data backhaul.

Charts 640 and 650 shown in FIG. 6C illustrate that effects of ambient conditions may be minimal with use of UWB communications. For example, performance may be assessed based on RF ambient environment, including inside and outside of tunnels as illustrated in charts 640 and 650. In this regard, as shown in the chats charts, the tunnel environment has less RF noise present than the control environment (ambient or control noise outside of tunnel), and at the frequencies used for UWB, there was no destructive interference present.

Figure 7:
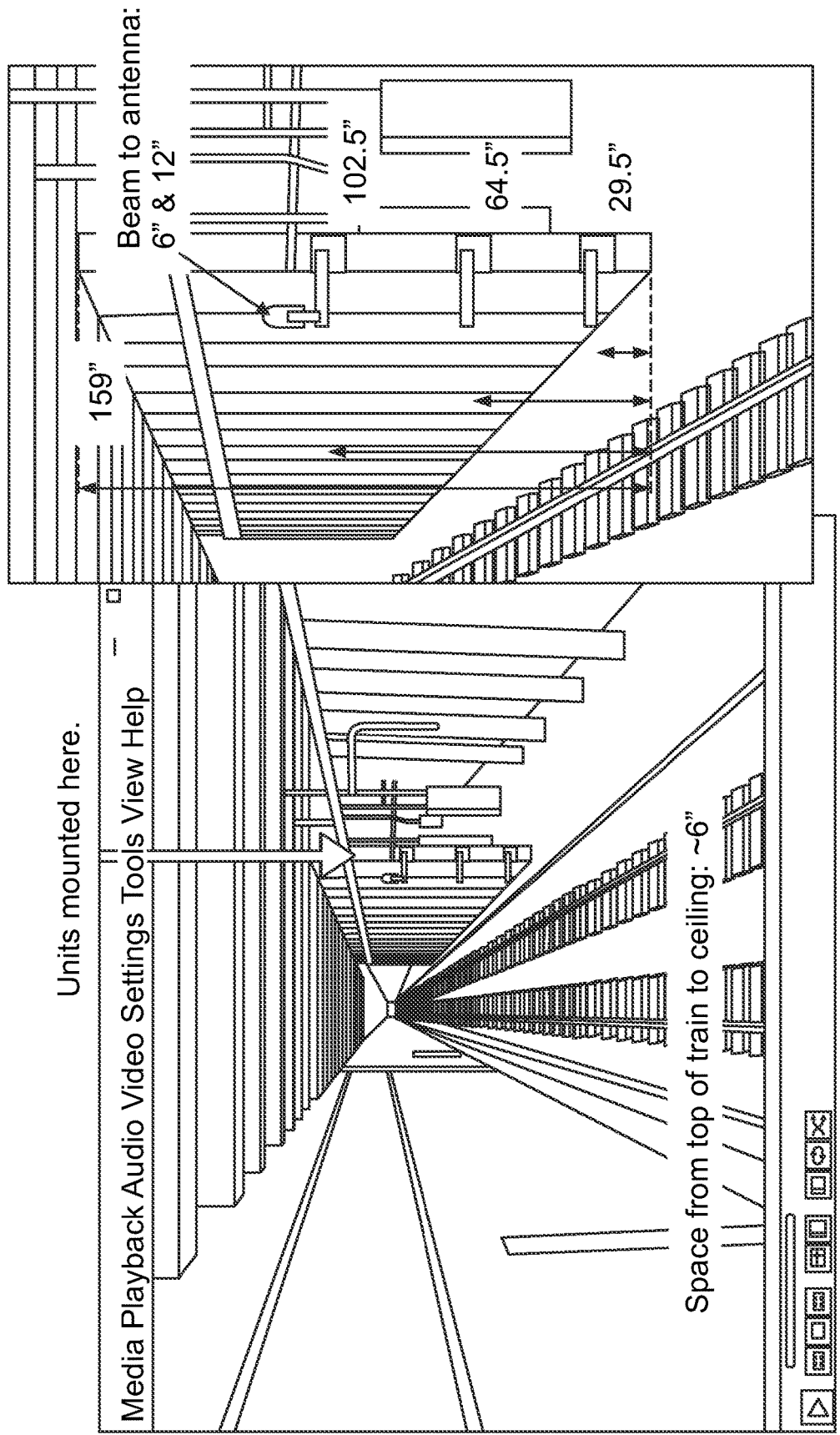
FIG. 7 illustrates various example anchor positions when deploying, within an existing transit system, a train control system, in accordance with the present disclosure.

FIG. 7 illustrates various example anchor positions when deploying, within an existing transit system, a train control system, in accordance with the present disclosure.

In this regard, as shown in FIG. 7, with respect to anchor position, experiments have been made in determining optimum anchor height and distance from tunnel structures such as metal and concrete columns. Optimal installation positions may be determined at various locations in transit systems. For example, optimal installation position may be determined at each location based on testing, such as based on ranging and signal-to-noise (S/N) analysis testing.

The proposed systems and/or solutions offer many key benefits. For example, with respect to performance, train spacing may be reduced by eliminating traditional fixed blocks and replacing them with anchor based moving blocks, where the length of the blocks dynamically changed based upon operating speed and conditions. Spacing may be adjusted based upon factors such as loading, schedules and may be optimized by the inclusion of support for future needs (e.g., AI linkage).

Also, additional safety measures such as the use of UWB for collision avoidance also offer redundant methods for determining train spacing such that additional safety factors such as empty blocks required in fixed block train control systems may be eliminated.

Figure 8:
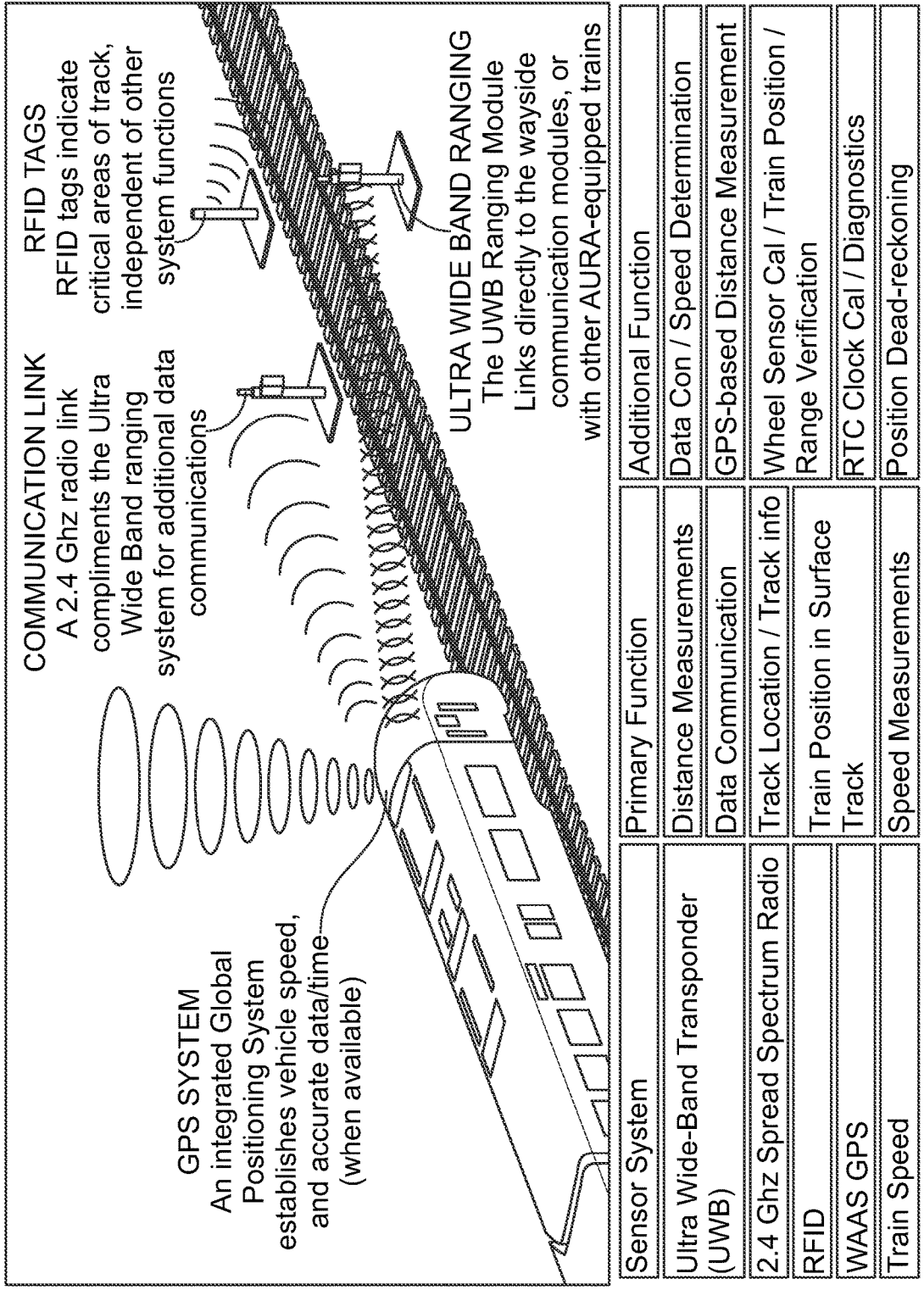
FIG. 8 illustrates use of redundant integrated sensing technologies in a train control system, in accordance with the present disclosure.

In some implementations, redundant integrated sensing technologies may be used to further enhance safety. Such redundant integrated sensing technologies may be combined through "sensor fusion" to allow for protection for trains, passengers, and workers. Thus, at any point in operation, several parallel systems are in operation, as shown in FIG. 8, which illustrates use of redundant integrated sensing technologies in a train control system, in accordance with the present disclosure.

In addition to safety, this redundant operation also allows for simpler integration into our safety case, as having multiple, basic, redundant systems in place simultaneously, allows for a lower cost and higher performing system with improved availability as a failure of one aspect of the system is covered by another.

Another key benefit is the full integration of worker protection systems, with both the workers and train operator receiving warnings. The on-board equipment may also be programmed to enable an auto-braking event in the event that speed and or distance to worker rules are violated.

Another key benefit is reliability: Key sub-systems utilize duplicate components which operate on 50% alternating duty cycles which improves system availability without adversely effecting safety case due to multiple system approach.

Another key benefit is compatibility: The modular components and rack approach in the train-borne (or carborne) equipment allows for local customization of hardware and software for seamless system integration without comprising or adversely affecting overall system operation. Wayside components are also designed for full integration with existing assets, using a similar approach.

Another key benefit is cost: installation cost may be reduced drastically, as existing wayside assets may be left in place, the train to wayside communication is wireless, and the train-borne (or carborne) components are compact such that they may be installed into existing areas, located near the interfaced components on the train, without requirements for additional power.

The Train-centric approach also may eliminate the cost of a back-office control hub, although it is designed such that a cloud-based link may be opened anyplace with an internet connection.

Another key benefit is installation advantages: time required for installation is drastically reduced in that the system may be installed in an accretive manner with assets being activated as they are installed. The entire system operates on separate wayside anchors, requiring only a power supply connection (and, optionally, a fiber optic data connection) which lends itself to shorter installation times, with minimal service interruptions.

The anchor approach also reduces maintenance effort and costs. Conventional CBTC systems use track-mounted transducers for train positioning detection. Mounting assets such as these on the track structure complicates periodically required track maintenance, such as "tamping" (realigning the track), railroad tie replacement, and rail replacement. Additional care and maintenance procedural steps are necessary when the transducers exist on the track. For example, in instances, transducers may be removed for maintenance, and then not reinstalled in the exact same location, potentially adding significant error and uncertainty to the determination of train position. An additional complication is that temperature changes and vibration result in movement of the track-mounted transducers, adding additional error to positioning.

Many transit systems operate trains at least 20 hours a day, such that time for service activities is very limited on the wayside, especially when installing new equipment. To this end, all wayside devices are designed to be customized such that existing mounting brackets, wiring and other interfaces are developed such that they arrive on the site ready to install with as many operations such as wire harnesses provided as sub-assembly, ready for installation.

The PTCS-2 based systems may be configured to respond in a fail-safe manner to all known failure modes of its components. In this regard, the response(s) may be implemented using the industry best practice. For example, the PTCS-2 based systems may be configured to support safety related functions that conform to such industry references as MIL-STD-882C, IEEE 1483-2000, and American Railway Engineering and Maintenance-of-Way Association (AREMA) Signal and Communications Manual Part 17. Safety related functions in PTCS-2 based systems may also be adapted for compliance with international standards, such as European Committee for Electrotechnical Standardization/International Electrotechnical Commission (CENELEC/IEC). Configuring the safety related functions may be done based on qualitative and quantitative safety assurance analyses.

Figure 9:
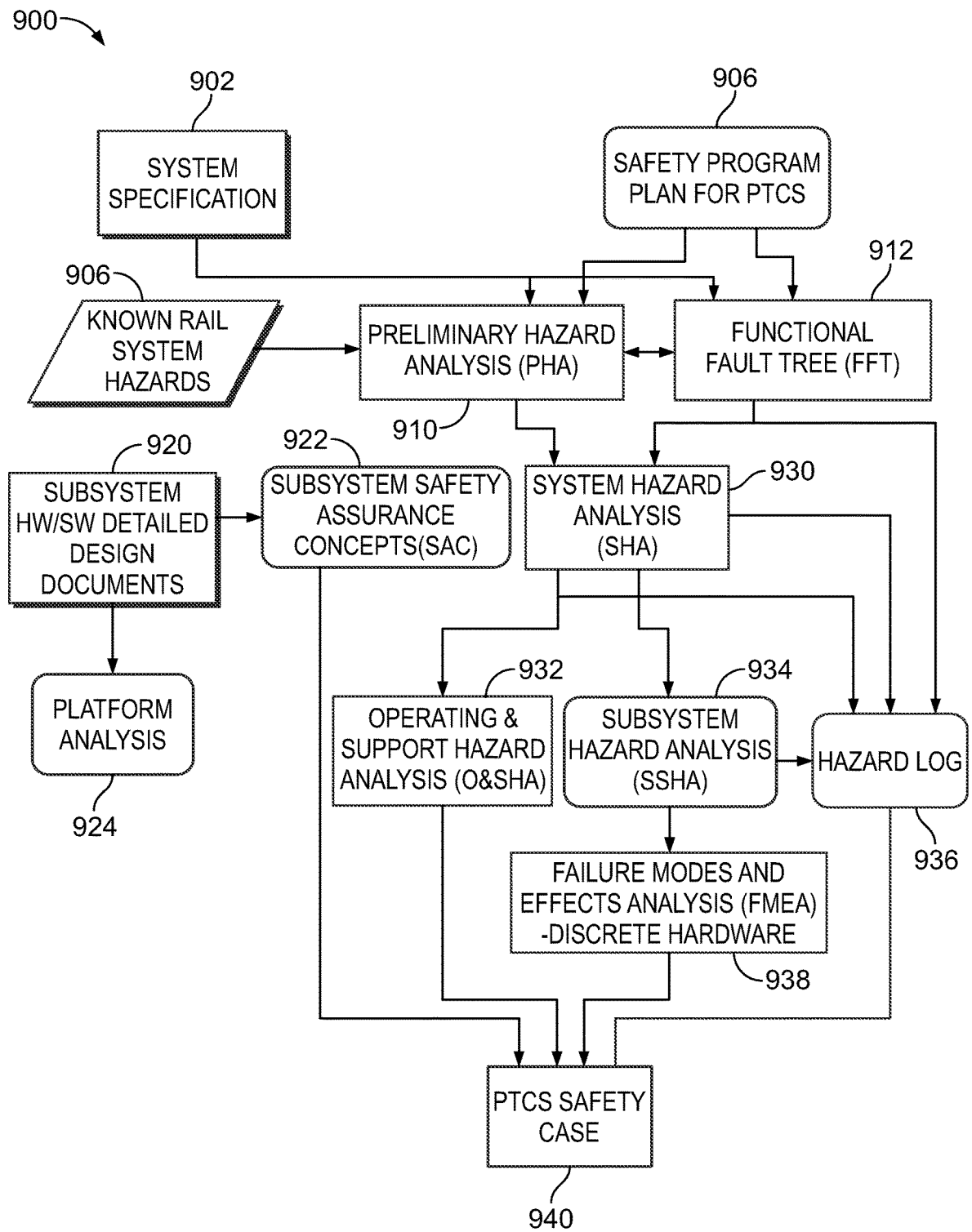
FIG. 9 illustrates example safety program flow chart for creating safety profiles (cases) for use during operation of a train control system, in accordance with the present disclosure.

FIG. 9 illustrates example safety program flow chart for creating safety profiles (cases) for use during operation of a train control system, in accordance with the present disclosure. Shown in FIG. 9 is flow chart 900, representing an example process for creating safety cases (profiles), which may be implemented by PTCS-2 based systems—e.g., by designing and/or configuring various components of such systems, such as the PTCS-2 based carborne units and/or the PTCS-2 based anchors.

In this regard, creating the safety cases may comprise defining and/or setting data and/or actions for monitoring and handling safety (hazard) conditions. As shown in FIG. 9, this may be done by performing preliminary hazard analysis (PHA) 910 and generating functional fault tree (FFT) 912, such as based on assessment of system specification 902, known rail system hazards 904, and safety program plan for PTCS-2 906. This may allow performing system hazard analysis (SHA) 930, and correspondingly, operating and support hazard analysis (O&SHA) 934 and subsystem hazard analysis (SSHA) 934. Also, hazard logging 936 may be performed. Further, the subsystem hazard analysis (SSHA) 934 may allow for performing failure modes and effects analysis (FMEA) 938. The process may further comprise performing, based on subsystem hardware/software (HW/SW) detailed design 920, a platform analysis 924, and generating subsystem safety assurance concepts (SAC) 922. The PTCS safety case(s) may then be generated 940.

Figure 10:
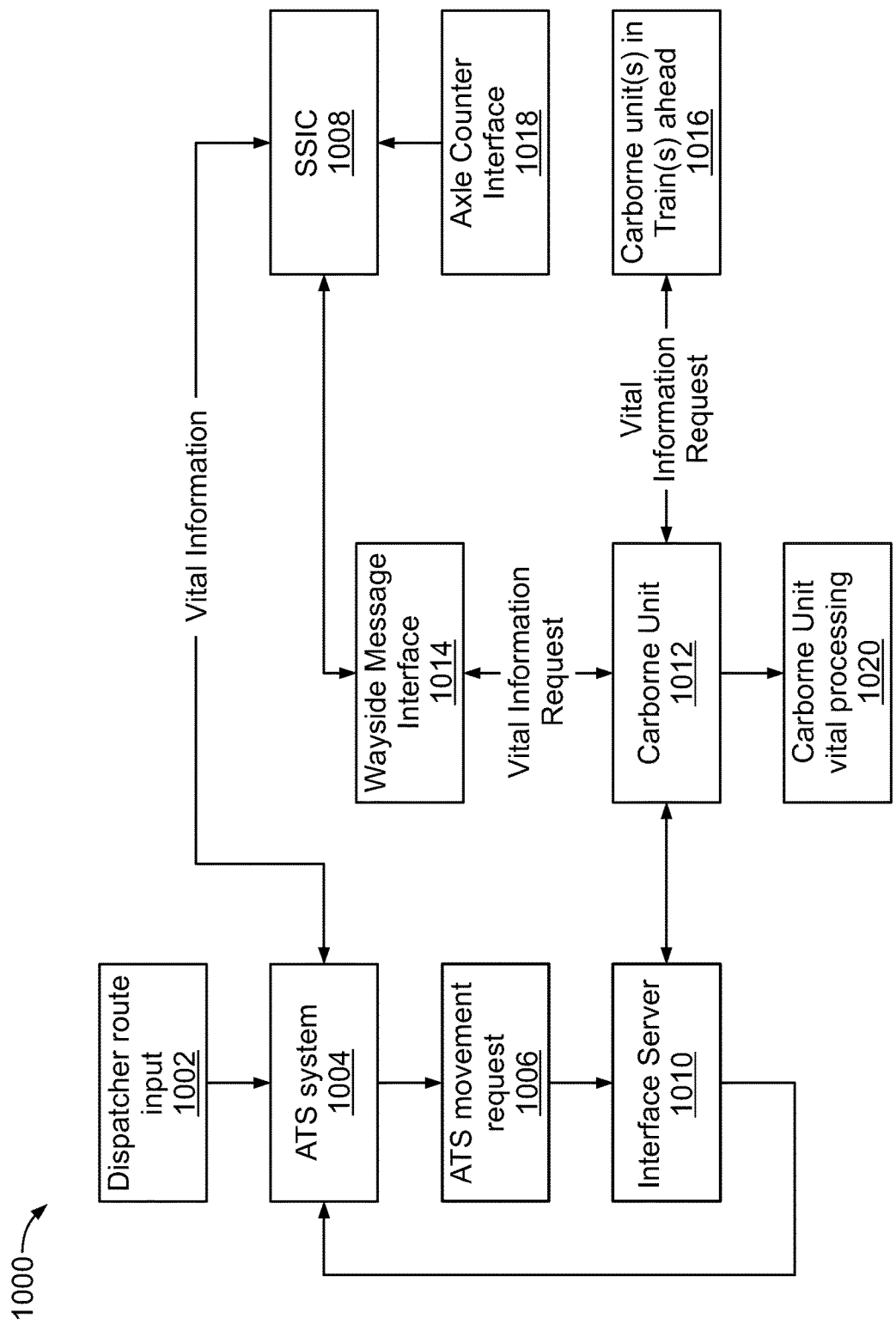
FIG. 10 illustrates example message and information exchange flow chart in a transit systems that utilizes PTCS-2 based components, in accordance with the present disclosure.

FIG. 10 illustrates example message and information exchange flow chart in a transit systems that utilizes PTCS-2 based components, in accordance with the present disclosure. Shown in FIG. 10 is chart 1000, illustrating message and information exchange in a rail systems configured for utilizing PTCS-2 based components and/or functions.

In an example use scenario illustrated in chart 1000, dispatcher route input 1002 may be provide the ATS system 1004, which may also obtain vital information from the solid-state interlocking controller (SSIC) 1008. The SSIC 1008 may obtain information from axle counter via axle counter interface 1018.

The ATS system 1004 may generate an ATS movement request 1006, which may be provided to the Interface Server 1010, which may in turn provide it to the carborne unit 1012. The Interface Server 1010 may also communicate back with the ATS system 1004, such as to provide information obtained from the carborne unit 1012 (e.g., regarding handling of the ATS movement request 1006).

The carborne unit 1012 may request and obtain vital information, such as from the wayside message interface (WMI) 1014 and/or from other carborne unit(s) in other train(s) ahead 1016. The carborne unit 1012 may then use any information pertinent to functions performed thereby (particularly based on the route provided by the dispatcher), by applying vital processing 1020 of the obtained information, from all sources.

In various implementations, PTCS-2 systems may be configured to provide various functions within the train and/or within the transit system as a whole. Some of these functions may be "enforcement" functions—that is, functions related directly to enforcement for vital train protection, while other functions may not be enforcement functions—i.e., not directly related to enforcement for vital train protection. Nonetheless, some of these non-enforcement functions may be relevant to and/or be used during enforcement scenarios. For example, while the location determination function (described below) may not be a train control enforcement function per se, it may be vital to and may be used in support of such enforcement functions as speed enforcement, train separation, temporary speed restrictions, etc.

In an example implementation, PTCS-2 systems may be configured for supporting location determination related functions. In this regard, PTCS-2 equipped train may be configured (e.g., via its PTCS-2 based carborne unit) to continuously tracks the train's location (e.g., based on the location of the PTCS-2 based carborne unit, which correlates to the train's location) within its operating territory (e.g., within the transit system). Use of such function may enable the train to localize its vital location while in motion or while stopped. Location in the operating territory for vital train control functionality may require determination of location along the track, identification of the specific track occupied by the train, and the direction of the train. Absence of any of these may prevent the ability of an PTCS-2 equipped train to localize. Likewise, loss of any of these following localizations will result in the PTCS-2 equipped train losing location and degrading to a reduced mode of operation.

In an example implementation, PTCS-2 systems may be configured for supporting determination of location along the track related functions. In this regard, PTCS-2 equipped train may be configured (e.g., via its PTCS-2 based carborne unit) to determine the train's location along the track using such mechanisms as UWB ranging against one or more fixed wayside devices and/or legacy track-mounted axle counters. For example, the PTCS-2 based carborne unit may be configured to use UWB ranging as the primary method of determining the train's location along the track. It is noted here that "legacy" as used herein and in other parts of the disclosure with respect to the axle counters refers to the fact that these devices are already used for train control, and not that there are legacy in that they already physically exist or are deployed in the transit systems—i.e., these axle counters may be installed as part of the deployment of the PTCS-2 system, to provide support to various functions of the system as auxiliary wayside devices (e.g., providing supplemental train control information, as well as a backup in the event of an UWB train control failure).

The track database, which is stored on the PTCS-2 based carborne unit, includes the locations of fixed ranging devices—e.g., railway signals and wayside devices (or anchors). By ranging against these fixed devices, the PTCS-2 based carborne unit may accurately determine the train's distance from the wayside device and location on the track map. Alternatively, if UWB ranging is unavailable, the PTCS-2 based carborne unit may use legacy infrastructure, such as legacy axle counters, to acquire degraded location on the track map. In some instances, however, the axle counters may be added with and/or included into the PTCS-2 system for the express purpose of providing an auxiliary wayside system (e.g., as back-up system).

Figure 11:
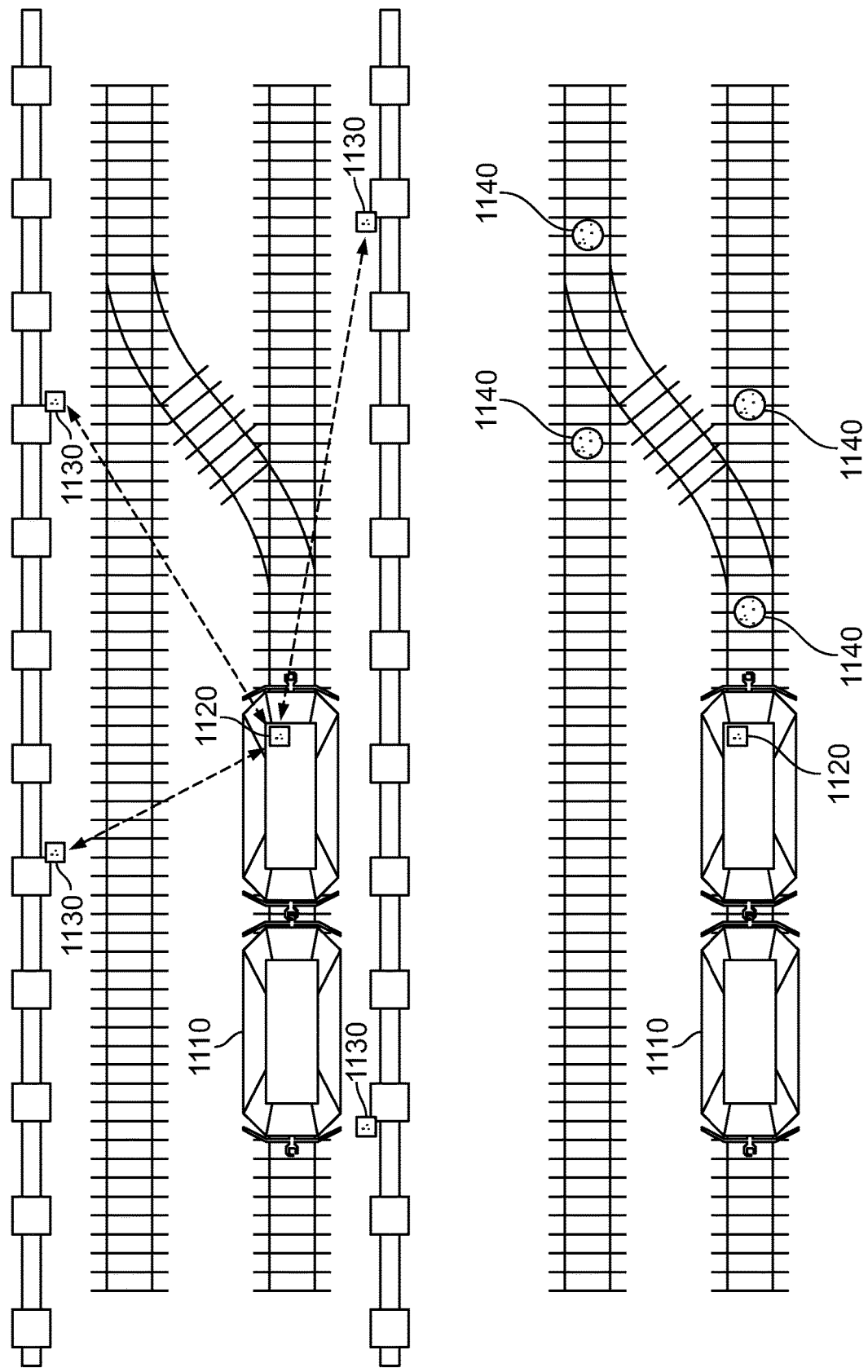
FIG. 11 illustrates example use scenario for utilizing PTCS-2 based system for track identification, in accordance with the present disclosure.

In an example implementation, PTCS-2 systems may be configured for supporting identification of track related functions. This is shown in FIG. 11, which illustrates example use scenario for utilizing PTCS-2 based system for track identification, in accordance with the present disclosure. Shown in FIG. 11 is train 1110, which incorporates PTCS-2 based carborne unit 1120 for operating within a PTCS-2 based transit system, which may incorporate wayside units or anchors 1130.

In this regard, in instance where the train 1110 is in a single track territory, then determination of location along the track may be enough to vitally determine location. However, if the train 1110 is in an area with two or more tracks, track identification may need to be determined to establish the train location. In such instances, the PTCS-2 based carborne unit 1120 may be configured to use various mechanisms for identifying the specific track occupied by the train 1110, such as using one or more of: 1) UWB ranging against multiple (e.g., three or more) fixed wayside units 1130—that is, trilateration as shown in FIG. 11; 2) traversal of a track-mounted legacy axle counters 1140, as shown in FIG. 11; 3) traversal of a converging switch (to single track; and 4) using a single anchor, in some situations and/or under certain conditions, as mentioned above—e.g., when a train slowly passes by a close anchor, thus achieving a minimum distance measurement which can only be achieved by a train operating on the track associated with that anchor (e.g., as determined using an available track database (map)).

For example, if the PTCS-2 based carborne unit 1120 is in range of three or more fixed ranging devices (wayside units 1130), the PTCS-2 based carborne unit 1120 may use trilateration based measurement and calculations to determine to the position with enough accuracy to vitally identify the current track. However, where trilateration is not possible—e.g., if the number or quality of fixed ranging devices doesn't permit trilateration, track identification may be determined by other means, such as based on detection of a wayside UWB anchor (when passing it), traversing a fixed and valid legacy axle counter 1140, and/or by traversing a converging switch when the converging leg is the beginning of single track. Relatedly, the PTCS-2 based carborne units may be configured to performed direction determination functions. For example, as shown in FIG. 11, the PTCS-2 based carborne unit 1120 uses UWB ranging against one or more fixed wayside units to determine the direction of the train 1110. Direction determination requires movement of the train 1110. If one or more wayside ranging devices are available, the PTCS-2 based carborne unit 1120 may use changes in range measurements during train movement to determine the train direction.

Figure 12A:
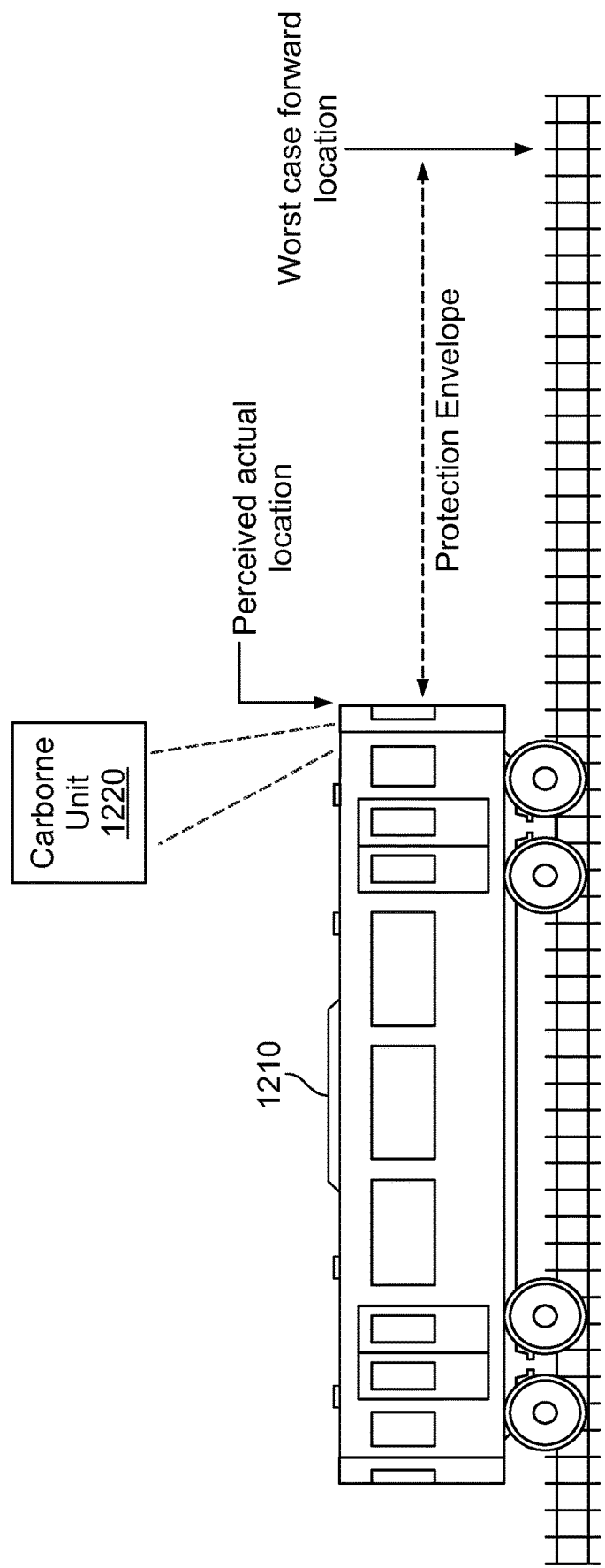
FIGS. 12A and 12B illustrate example use scenarios for utilizing PTCS-2 based system for establishing and maintaining train location with protection envelope, in accordance with the present disclosure.
Figure 12B:
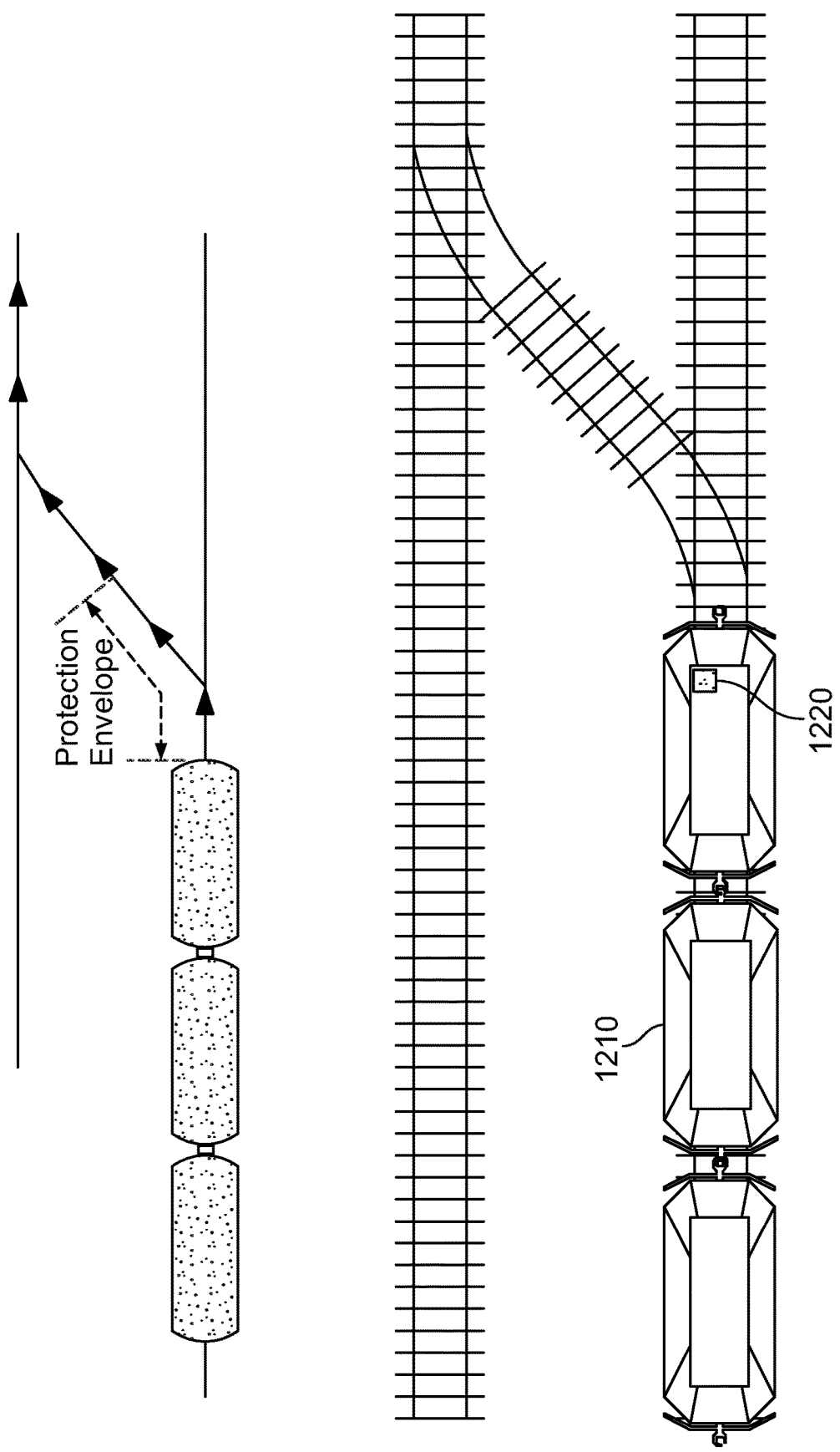

In an example implementation, PTCS-2 systems may be configured for supporting establishing and maintaining train location with protection envelope related functions. This is shown in FIGS. 12A and 12B, which illustrates example use scenarios for utilizing PTCS-2 based system for establishing and maintaining train location with protection envelope, in accordance with the present disclosure. Shown in FIG. 12 is train 1210, which incorporates PTCS-2 based carborne unit 1220 for operating within a PTCS-2 based transit system.

In this regard, the PTCS-2 based carborne unit 1220 may be configured to maintain train location related information, comprising both a "perceived actual location" and a "worst-case forward location." For the perceived actual location, the PTCS-2 based carborne unit 1220 may determine the perceived actual location based on processing of all available location inputs, to determine the most likely train location at a given point in time. Example location inputs to the location processing algorithms may include: UWB ranging against one or more fixed wayside devices, legacy axle counters, GPS signals, etc. The worst-case forward location may be a range ahead of the perceived actual location, determined to create a virtual protection envelope, as shown in FIG. 12A. In this regard, enforcement functions of the train control system may be configured and/or applied based on the protection envelope—i.e., the worst-case forward location.

The distance between the perceived actual location and worst-case forward location may be a function of a default safety buffer, the number and quality of location inputs available at any point in time, and the current speed of the train. In other words, the worst case forward location, and thus the protection envelope, may be determined based on measurement and/or calculations that account for messaging related delays, movement of train, and other possible errors in the system (e.g., measurement errors). Thus, as the train speed increases or location inputs degrade (e.g. loss of UWB ranging) the protection envelope grows; whereas, when location inputs are recovered (e.g. UWB ranging) or the train traversal of a known fixed point, the protection envelope retracts.

In some instances, a configurable limit may be applied to the size of the protection envelope. If the protection envelope exceeds this limit the PTCS-2 based carborne unit 1220 considers this loss of train location and downgrades to a reduced mode of operation until the location can be reestablished.

The determination of the protection envelope may also be configured to account for changes in the train's route, such as based on determined switch positions as illustrated in FIG. 12B. Thus, if the protection envelope traverses a diverging switch in an unknown position the track identification is lost. The PTCS-2 based carborne unit 1220 considers this loss of train location and downgrades to a reduced mode of operation until location can be reestablished.

Figure 13:
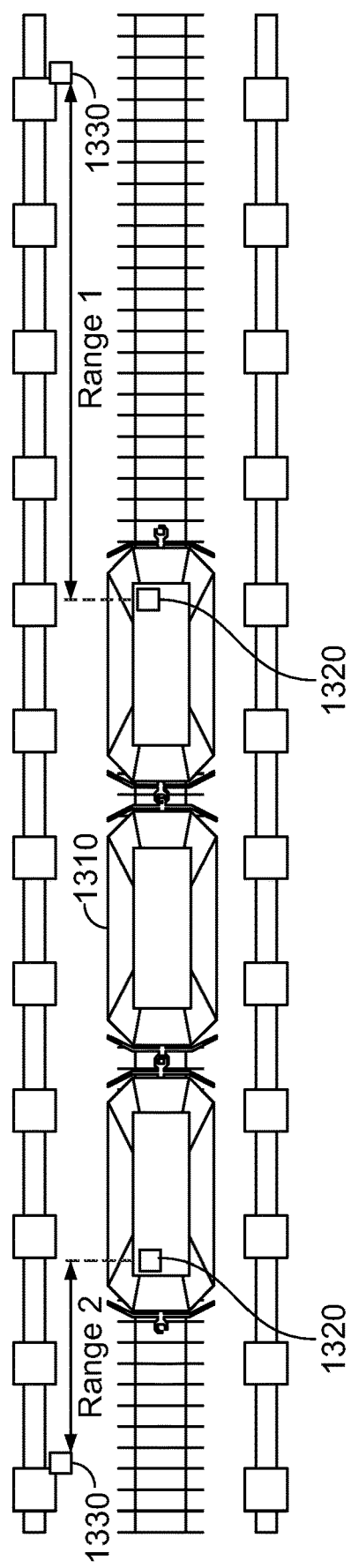
FIG. 13 illustrates example use scenarios for utilizing PTCS-2 based system for speed determination, in accordance with the present disclosure.

In an example implementation, PTCS-2 systems may be configured for supporting speed determination related functions. This is shown in FIG. 13, which illustrates example use scenarios for utilizing PTCS-2 based system for speed determination, in accordance with the present disclosure. Shown in FIG. 13 is train 1310, which incorporates PTCS-2 based carborne units 1320 for operating within a PTCS-2 based transit system, which may incorporate wayside units or anchors 1330. In this regard, the PTCS-2 based carborne units 1320 may be configured to use UWB ranging against one or more fixed wayside devices to determine the train speed. For example, in order to use UWB ranging for speed determination, the PTCS-2 based carborne units 1320 may need executed multiple range measurements to two or more fixed wayside devices and effectively calculated the train speed as distance traveled over time.

In the example use scenario shown in FIG. 13, each of the two PTCS-2 based carborne units 1320, which are located at the two ends of the trains, may determine respective ranges (shown as range 1 and range 2) to corresponding wayside anchors 1330 from the two ends of the train. The train speed may be calculated for each fixed wayside device—e.g., by each of two PTCS-2 based carborne units 1320, the based on changes in two ranges (range 1 and range 2), and the train speed is determined as the maximum of the two speed measurements. To guard against speed determination errors, variance between the two speed measurements exceeds a predefined threshold then speed determination is considered lost and the system downgraded to a reduced mode of operation. The threshold of variability between measured speeds may be configurable.

In an example implementation, PTCS-2 systems may be configured for supporting brake control related functions. In this regard, PTCS-2 equipped train may be configured (e.g., via its PTCS-2 based carborne unit) for controlling train brakes, such as a means of providing enforcement in support of train protection and safety. Various mechanisms may be used for implementing such brake control. For example, the PTCS-2 based carborne unit may be configured to use an optional non-vital serial interface to the integrated brake system in the train. Using such non-vital serial interface, the PTCS-2 based carborne unit may send commands for various levels of braking, including full service brake. Alternatively or additionally, the PTCS-2 based carborne unit may be configured to use a mandatory vital discrete output, which may be used for vital application of full service or emergency brake. This may be done to provide more severe brake rate in the event the non-vital application may not achieve the required rate of deceleration.

In an example implementation, PTCS-2 systems may be configured for supporting train tracking related functions. In this regard, PTCS-2 equipped train may be configured (e.g., via its PTCS-2 based carborne unit) to periodically broadcasting the current location of the train, as the train traverses within its operating territory, to nearby wayside devices (e.g., via the Data Communication System (DCS) network). The wayside devices may in turn communicate the current train location, such as via the Wayside Message Interface (WMI), over a dedicated network (e.g., fiber network). In this regard, the WMI may maintain real-time tracking of all PTCS-2 equipped trains. In a large territory requiring more than one WMI, each WMI may be responsible for maintaining train tracking within its respective zone, and to coordinate handover of trains transitioning between zones with the adjacent WMI.

In some instances, the data transmission between the PTCS-2 equipped trains and the wayside devices, as well as between the wayside devices and the WMI incorporate defenses to ensure message authenticity, integrity, timeliness, freshness, and sequence.

If loss of communication occurs while a train is traversing the track, the WMI may lose the ability to vitally track that train's location. Thus, when this occurs, responsibility for tracking of the train may be handed over to a series of underlying legacy axle counters. Further, protection against an unequipped or malfunctioning PTCS-2 equipped train may commence exclusively using fixed block principals in accordance with the blocks established by the legacy axle counter.

In an example implementation, PTCS-2 systems may be configured for supporting target tracking related functions. In this regard, the PTCS-2 based carborne unit of a PTCS-2 equipped train may be configured to maintain a list of targets in the train's path as the PTCS-2 equipped train traverses the operating territory, with relevant data for each target. Items that may constitute "targets" include, but are not limited to, anchors (or wayside devices in general), signals, switches, station platforms, other PTCS-2 equipped trains, speed restriction boundaries, work zone boundaries, end of track bumpers, and territory boundaries. In this regard, with decentralized control each PTCS-2 equipped train may maintain the updated location of a train or trains in its "visibility zone"—that is, within the necessary distance ahead to ensure safety in worst case conditions, such that each train may calculate the maximum distance and track path it can travel safely. Such movement authority limit (MAL) may be shared with other trains as they continuously inquire to ensure that the MALs don't overlap and create an unsafe condition.

Each of the targets in the list may be associated with attributes to identify important information such as target type, location, health, operating status, etc. Targets that are permanent fixtures (e.g. anchors, signals, switches, etc.) may be acquired by the PTCS-2 equipped train from a track database. Volatile targets (e.g. other PTCS-2 equipped trains, Work Zone boundaries, etc.) may be acquired via data communication with the targets, directly and/or indirectly (e.g., via the WMI). Targets with volatile attributes that contribute to operational safety (e.g. switch position, signal status, other PTCS-2 equipped train location or direction) may be set such that they may require periodic updates to ensure freshness. In this regard, updates may be acquired via data communication.

An PTCS-2 equipped train may be configured to treat targets with expired attributes in the most restrictive state applicable to that target type. The data transmission between the PTCS-2 equipped trains and the wayside anchors may incorporate defense measures to ensure message authenticity, integrity, timeliness, freshness, and sequence. Detected failures may result in treating the respective target in the most restrictive state applicable to that target type.

In an example implementation, PTCS-2 systems may be configured for supporting speed enforcement related functions. In this regard, PTCS-2 equipped train may be configured (e.g., via its PTCS-2 based carborne unit) for determining and/or enforcing applicable speed limits. For example, are may be three primary types of speed limits enforceable by the PTCS-2 based carborne unit: 1) civil speed limits; 2) temporary speed restrictions; and 3) restrictive speed limits associated with degraded modes of operation. Civil speed limits may be captured in a track database (associated with particular track). Temporary speed restrictions may not part of the track database, but rather are communicated to an PTCS-2 equipped train—e.g., from the WMI. When an PTCS-2 equipped train is operating in a degraded mode of operations (e.g. pre-initialized, loss of location, en route failure), a configurable restrictive speed, may be allocated to degraded mode.

In some instances, the PTCS-2 based carborne unit may maintain a list of all speed limits applicable to the determined location and may enforces the most restrictive of those. While enforcement of the most restrictive speed is a vital function, determination of the most restrictive speed may not be. This is also true for temporary speed restrictions and operation in degraded modes. In an example use scenario, acquisition of temporary speed limits may be initiated by the dispatcher entering information in to the ATS system. The ATS may then send the speed restriction message to the WMI. The WMI may send a vital message to all trains and the carborne system applies vital logic to implement the restriction. When operating in a degraded mode, enforcement of the associated speed limit is a vital function, depending on the reason for being in a degraded mode it is possible for there to be a more restrictive speed limit that the PTCS-2 based carborne unit is unable to acquire.

The PTCS-2 based carborne unit may enforce the most restrictive speed limit it has for the determined train location. Speed enforcement may be configured for using configurable overspeed allowance, prior to automatic enforcement. Thus, if the determined train speed exceeds the speed limit, but not the overspeed allowance, the PTCS-2 based carborne unit may provide an indication (e.g., audible and visual warning) to the train operator of pending enforcement. This provides the train operator with the opportunity to comply before automatic enforcement is executed after a configurable time delay. If the determined train speed exceeds the configurable overspeed allowance the PTCS-2 based carborne unit automatically enforces by brake application.

Enforcement application may occur by vital application of full service or emergency braking, or alternatively may be configured to apply the full service braking or a less severe rate of braking using non-vital means. The PTCS-2 based carborne unit may be configured to, when using the non-vital means of enforcement, monitor the deceleration rate and apply vital enforcement if the desired configurable deceleration rate is not met. The PTCS-2 based carborne unit may be configured to release enforcement brakes once the determined train speed complies with the determined speed limit (or slower by a configurable margin), or to hold the enforcement brakes until the train has come to a complete stop.

In an example implementation, PTCS-2 systems may be configured for supporting signal enforcement related functions. In this regard, PTCS-2 equipped train may be configured (e.g., via its PTCS-2 based carborne unit) for enforcing signals, such as based on a list of signals in the train's path, which may be maintained by the PTCS-2 based carborne unit. For example, as an PTCS-2 equipped train traverses the operating territory, when the train approaches signals (e.g., indicated in the list), the PTCS-2 based carborne unit may establish wireless communication with each signal and/or wayside devices at or near the signals, such as to acquire the signal's current status and other information. In some instances, the data transmission between the PTCS-2 equipped trains and the signals (and/or wayside devices at or near the signals) may incorporate defenses to ensure message authenticity, integrity, timeliness, freshness, and sequence. The PTCS-2 based carborne unit may also use UWB ranging (e.g., the signal) to determine the distance from the train to the signal.

In some instances, with signals at interlocks, the signal state and interlock state may be monitored by the solid-state interlocking controller (SSIC) and associated legacy axle counters. When a train is approaching an interlock, it may receive vital information from the solid-state interlocking controller, such as via the WMI, as well as directly from the UWB equipped signal. Various handling criteria may be used in conjunction with signal enforcement. For example, an unhealthy or non-communicating signal, or one for which the status age exceeds a configurable threshold is treated as a stop signal. A signal for which the inconsistency between the signal's location determined via UWB ranging and the expected signal's location as calculated based on the determined train location and the signal location captured in the track database exceeds a predefined threshold is treated as a stop signal.

In an example use scenario, as an PTCS-2 equipped train approaches a signal it uses pertinent information (e.g., the train's determined location, train's speed, location and status of the signal, and applicable braking curve) to determine the point at which enforcement must occur in order to comply with the signal. The PTCS-2 based carborne unit may provide corresponding output to the operator—e.g., displaying a countdown of time remaining for the operator to reduce speed to comply with the signal. When the countdown reaches a configurable threshold, the system may provide an indication (e.g., audible and visual warning) to the train operator of pending enforcement. If the train is not in compliance before reaching the enforcement point, the PTCS-2 based carborne unit automatically enforces signal compliance, such as by brake application. Enforcement application may occur by vital application of full service or emergency braking, or alternatively, may be configured to apply the full service brake or a less severe rate of braking using non-vital means. If using the non-vital means of enforcement, the PTCS-2 based carborne unit will monitor the deceleration rate and apply vital enforcement if the desired configurable declaration rate is not met.

In an example implementation, PTCS-2 systems may be configured for supporting enforcement of train separation related functions. For example, as an PTCS-2 equipped train traverses the operating territory it maintains a list of other PTCS-2 equipped trains in its path and various attributes about the other train(s) (e.g. location, direction, speed & the freshness of this data). As a train enters a section of track, the train may obtain (e.g., via the WMI) identification information (e.g., Train ID) of trains ahead. As the train approaches other PTCS-2 equipped trains in its path, it establishes wireless communication with the other trains, to acquire the pertinent information associated therewith (e.g., train's location, speed, direction, and status), as determined by the other train). In this regard, "status" may include train consist length, and "location" may include the location of the front and rear of the train, so that the entire extent of the track occupied by the train is known. The PTCS-2 equipped train may determine the train ahead, and may monitor that train's location to ensure safe separation. The data transmissions between the PTCS-2 equipped trains may incorporate defenses to ensure message authenticity, integrity, timeliness, freshness, and sequence.

In some instances, the PTCS-2 equipped train may be configured to take various measures in identifying and handling conditions affecting train safety. For example, an unhealthy or non-communicating train, or one for which the age of data exceeds a configurable threshold is treated as a failed train. In the event of a failed train, separation is maintained in accordance with fixed blocks, as established by underlying legacy axle counter track circuits, or by enforcing a stop for the current PTCS-2 equipped train until the location of trains in its path can be assured.

In some instances, the PTCS-2 equipped train uses its own direction, location, and speed with the known data about other PTCS-2 equipped trains in its path to calculate separation distance and closing speed. This information with the applicable braking curve for the train is used to determine the point at which automatic enforcement is required to safely maintain desired train separation. Much like with signal enforcement, the PTCS-2 based carborne unit displays to the operator a countdown of time remaining for the operator to reduce speed to comply with the train separation requirements before the system will apply automatic enforcement. When the countdown reaches a configurable threshold, the system provides audible and visual warning to the train operator of pending enforcement. This provides the train operator with the opportunity to comply before enforcement or at least prepare the train for enforcement if enforcement is unavoidable. If the train is not in compliance before reaching the enforcement point the PTCS-2 based carborne unit will automatically enforce by brake application.

Enforcement application may occur by vital application of full service or emergency braking, or alternatively may be configured to apply the full service brake or a less severe rate of braking using non-vital means. If using the non-vital means of enforcement, the PTCS-2 based carborne unit will monitor the deceleration rate and apply vital enforcement if the desired configurable declaration rate is not met.

In an example implementation, PTCS-2 systems may be configured for supporting work zone protection related functions. In this regard, various rail related systems (e.g., ATS systems) may incorporate work zone protection, and PTCS-2 equipped train may be configured (e.g., via its PTCS-2 based carborne unit) for supporting such work zone protection. In an example use scenario, a dispatcher enters the work zone information. The ATS system generates a message (e.g., on an Interface Server) that is then sent to the WMI. The message may comprise such information as location related information (e.g., start and end) and timing related information (e.g., start and end times) of the work zone. The WMI sends the message to all trains. Each train, using UWB location information, may determine (e.g., by applying vital logic) if the message applies to that particular train. If the message does not apply the carborne system will continue to test message application until the work zone time expires. A separate message can be initiated by the dispatcher to end a work zone restriction immediately.

In an example implementation, PTCS-2 systems may be configured for supporting topographical track map (database) related functions. In this regard, PTCS-2 equipped train may be configured (e.g., via its PTCS-2 based carborne unit) for generating, maintaining, and/or updating track map (database), which may be used for other functions. The track database may comprise map (e.g., topographical data) for the operating territory, including but not limited to: anchor locations, civil speed limits, switch location, signal locations, relative track grade, station platform locations, and end-of-track bumper locations. The track database may (or may not) include dynamic data, such as temporary speed restrictions, ranging results, train speed, etc. The track database may be loaded directly onto the PTCS-2 based carborne unit, such as by maintenance personnel (e.g., using PE 180, as shown in FIG. 1), or may be wirelessly loaded from a train control server (e.g., as part of departure test). The track database may comprise several files. For added security and reliability, each file may include error detection and protection measures (e.g., cyclic redundancy check (CRC)), to ensure that any corruption is detectable. In some instances, the track database as a whole may similarly include error detection and protection measures—e.g., a dedicated CRC file that provides collective protection for the track database in its entirety.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A train-mounted device, configured for use within a train to support a decentralized positive train control system, the train-mounted device comprising:
 one or more antennas, configured for transmitting and/or receiving wireless signals; and
 one or more circuits configured to:
  process signals and data, and
  perform one or more functions relating to decentralized positive train control;
 wherein the train-mounted device is configured to, during operation of the train within a railway network that supports use of the decentralized positive train control system:
  communicate with any wayside unit and/or other train-mounted unit that comes within communication range of the train-mounted unit, wherein the communicating comprises transmission and/or reception of ultra-wideband (UWB) based signals;
  process the ultra-wideband (UWB) based signals; and
  generate based on the processing of the ultra-wideband (UWB) based signals, decentralized control information that controls one or more functions of the train in conjunction with operation in the railway network,
 wherein the one or more functions comprise at least assessing based on UWB communication with at least one wayside unit operation of the train on a route based on route-related information,
 wherein at least a portion of the route-related information is provided by a remote dispatcher via an automatic train supervision (ATS) system to the train-mounted unit, and
 wherein the assessing comprises tracking end of the route.

2. The train-mounted device of claim 1, wherein the train-mounted device is configured to generate at least part of the control information based on sources other than the processing of the ultra-wideband (UWB) based signals.

3. The train-mounted device of claim 1, wherein the train-mounted device is configured to:
 assess based on the processing of the processing of the ultra-wideband (UWB) based signals, one or more conditions relating to operation of the train within the railway network;
 when at least one condition meets one or more particular criteria, determine one or more responsive actions; and
 perform or cause performing each of the one or more responsive actions.

4. The train-mounted device of claim 3, wherein, when the one or more responsive actions comprise providing indication or feedback, relating to the at least one condition, to a train operator, the train-mounted unit is configured to:
 monitor actions of the train operator;
 assess based on the monitoring, the train operator's compliance with at least one expected subsequent responsive action; and
 when the train operator fails to do so, directly perform the at least one expected subsequent responsive action or perform an alternative action.

5. The train-mounted device of claim 1, wherein the train-mounted device is configured for utilizing non-UWB based signals for communicating at least some data with the wayside unit and/or the other train-mounted unit.

6. The train-mounted device of claim 1, wherein the train-mounted device is configured for handling radio-frequency identification (RFID) based signals with RFID devices used within the railway network.

7. The train-mounted device of claim 1, wherein the train-mounted device is configured for handling satellite based signals.

8. The train-mounted device of claim 7, wherein the train-mounted device is configured for obtaining from received satellite based signals information, and generating or adjusting the control information based on the obtained information.

9. The train-mounted device of claim 1, wherein the train-mounted device is configured for connecting to and/or interfacing with other systems of the train.

10. The train-mounted device of claim 1, comprising one or more input/output (I/O) components, for receiving input from an operator of the train and/or for providing output to the operator of the train.

11. The train-mounted device of claim 1, comprising a power component for supplying and/or obtaining power for components of the train-mounted device.

12. The train-mounted device of claim 1, wherein the train-mounted device is configured for communicating, directly or via at least one of the wayside unit and another train-mounted device, with one or more other components or devices in the railway network, the one or more other components or devices in the railway network not being part of decentralized train control system.

* * * * *